(12) United States Patent
Meyer et al.

(10) Patent No.: US 9,004,827 B2
(45) Date of Patent: Apr. 14, 2015

(54) ADJUSTABLE INDEXABLE DRILL AND MODULAR SYSTEM AND HOLDER

(71) Applicant: Allied Machine & Engineering Corp., Dover, OH (US)

(72) Inventors: Mark D. Meyer, Wapakoneta, OH (US); Kevin D. Myers, Wapakoneta, OH (US)

(73) Assignee: Allied Machine & Engineering Corp., Dover, OH (US)

(*) Notice: Subject to any disclaimer, the term of this patent is extended or adjusted under 35 U.S.C. 154(b) by 153 days.

(21) Appl. No.: 13/832,105

(22) Filed: Mar. 15, 2013

(65) Prior Publication Data

US 2013/0202376 A1 Aug. 8, 2013

Related U.S. Application Data

(63) Continuation-in-part of application No. 12/558,981, filed on Sep. 14, 2009, now Pat. No. 8,517,644, which is a continuation-in-part of application No. 12/209,931, filed on Sep. 12, 2008, now Pat. No.

(Continued)

(51) Int. Cl.
*B23B 51/00* (2006.01)
*B23B 51/02* (2006.01)

(Continued)

(52) U.S. Cl.
CPC .............. *B23B 51/02* (2013.01); *B23B 51/048* (2013.01); *B23B 51/126* (2013.01); *B23B 2200/0419* (2013.01); *B23B 2200/0438* (2013.01); *B23B 2200/0447* (2013.01); *B23B 2251/02* (2013.01);

(Continued)

(58) Field of Classification Search
USPC .................. 408/223–225, 227, 229, 233, 713
IPC ....................................................... B23B 51/00
See application file for complete search history.

(56) References Cited

U.S. PATENT DOCUMENTS 3,540,323 A 11/1970 Rishel
3,963,365 A 6/1976 Shallenberger, Jr.
(Continued)

FOREIGN PATENT DOCUMENTS

CN 1767918 5/2006
DE 25 22 565 12/1976
(Continued)

OTHER PUBLICATIONS

International Search Report/Written Opinion for PCT/US09/56790 mailed Apr. 26, 2010.
(Continued)

*Primary Examiner* — Eric A Gates
(74) *Attorney, Agent, or Firm* — Hahn Loeser + Parks LLP

(57) ABSTRACT

An adjustable drill is provided comprising a drill body having at least one face surface with a plurality of serrations provided therewith. The drill further has at least one cartridge having a cooperating plurality of second serrations, to be driven with the drill body when assembled therewith. The at least one cartridge includes at least one insert pocket, and at least one insert is releasably affixed in the insert pocket provided in the cartridge. In further examples, the adjustable drill may have a central cutting system in combination with the adjustable cartridge type system, wherein the central cutting system may be modular. There may also be provided a modular type of holder arrangement to provide flexibility to adapt the system for various applications.

20 Claims, 25 Drawing Sheets

Related U.S. Application Data 8,506,212, which is a continuation-in-part of application No. 12/134,766, filed on Jun. 6, 2008, now Pat. No. 8,480,338.

(60) Provisional application No. 60/942,493, filed on Jun. 7, 2007.

(51) Int. Cl.
*B23B 51/04* (2006.01)
*B23B 51/12* (2006.01)

(52) U.S. Cl.
CPC ....... *B23B 2251/50* (2013.01); *B23B 2260/004* (2013.01); *B23B 2260/038* (2013.01); *B23B 2260/132* (2013.01); *Y10S 408/713* (2013.01)

(56) References Cited

U.S. PATENT DOCUMENTS

| | | | |
|---|---|---|---|
| 4,043,697 A | 8/1977 | Eckle | |
| 4,101,239 A | 7/1978 | Wohlhaupter | |
| 4,124,328 A | 11/1978 | Hopkins | |
| 4,194,862 A | 3/1980 | Zweekly | |
| 4,278,373 A | 7/1981 | Wolfe, III | |
| 4,303,358 A | 12/1981 | Grusa | |
| 4,365,397 A | 12/1982 | Felpel | |
| 4,367,991 A | 1/1983 | Grafe et al. | |
| 4,563,113 A | 1/1986 | Ebenhoch | |
| 4,595,320 A | 6/1986 | Berner et al. | |
| 4,632,609 A | 12/1986 | Johne | |
| 4,642,001 A | 2/1987 | Gill et al. | |
| 4,648,760 A | 3/1987 | Karlsson et al. | |
| 4,659,264 A | 4/1987 | Friedline | |
| 4,859,123 A | 8/1989 | Koesashi et al. | |
| 4,889,455 A | 12/1989 | Karlsson et al. | |
| 4,929,131 A | 5/1990 | Allemann | |
| 4,984,943 A | 1/1991 | Hamilton | |
| 5,049,011 A | 9/1991 | Bohnet et al. | |
| 5,092,718 A | 3/1992 | Shallenberger | |
| 5,176,477 A | 1/1993 | Noggle | |
| 5,188,490 A | 2/1993 | Muendlein et al. | |
| 5,259,707 A | 11/1993 | Keller | |
| 5,269,618 A | 12/1993 | Meyer | |
| 5,302,059 A | 4/1994 | Fabiano | |
| 5,314,272 A | 5/1994 | Kubota | |
| 5,330,297 A | 7/1994 | Engstrand | |
| 5,340,246 A | 8/1994 | Tukala | |
| 5,474,407 A | 12/1995 | Rodel et al. | |
| 5,478,179 A | 12/1995 | Kress et al. | |
| 5,503,509 A | 4/1996 | von Haas et al. | |
| 5,509,761 A | 4/1996 | Grossman et al. | |
| 5,609,446 A | 3/1997 | Link et al. | |
| 5,688,083 A | 11/1997 | Boianjiu | |
| 5,758,997 A | 6/1998 | Mealey et al. | |
| 5,820,318 A | 10/1998 | Danielsson et al. | |
| 5,848,862 A | 12/1998 | Antoun | |
| 5,863,161 A | 1/1999 | Tayne et al. | |
| 5,947,660 A | 9/1999 | Karlsson et al. | |
| 6,000,887 A | 12/1999 | Hoefler et al. | |
| 6,039,515 A | 3/2000 | Lamberg | |
| 6,220,795 B1 | 4/2001 | Matthews | |
| 6,524,034 B2 | 2/2003 | Eng et al. | |
| 6,527,486 B2 | 3/2003 | Wiman et al. | |
| 6,599,050 B1 | 7/2003 | Sjoo | |
| 6,612,788 B2 | 9/2003 | Thomas et al. | |
| 6,626,614 B2 | 9/2003 | Nakamura | |
| 6,880,437 B2 | 4/2005 | Sjoo et al. | |
| 6,929,432 B2 | 8/2005 | Roman et al. | |
| 6,948,891 B2 | 9/2005 | Roman | |
| 6,984,094 B2 | 1/2006 | Nuzzi et al. | |
| 7,073,987 B2 | 7/2006 | Hecht | |
| 7,083,367 B2 | 8/2006 | Delett | |
| 7,144,205 B2 | 12/2006 | Sheffler et al. | |
| 7,153,071 B2 | 12/2006 | Blomberg et al. | |
| 7,156,588 B2 | 1/2007 | Elbaz et al. | |
| 7,201,542 B2 | 4/2007 | Fritsch et al. | |
| 7,217,070 B2 | 5/2007 | Hecht | |
| 7,244,081 B2 | 7/2007 | Johnson et al. | |
| 7,261,498 B2 | 8/2007 | Hecht et al. | |
| 7,338,237 B2 | 3/2008 | Frejd | |
| 7,354,228 B2 | 4/2008 | Lambert | |
| 7,556,458 B2 | 7/2009 | Heilmann et al. | |
| 7,717,654 B2 | 5/2010 | Cirino | |
| 8,079,785 B2 | 12/2011 | Nicholas | |
| 8,747,034 B2 * | 6/2014 | Stadelmann et al. | ......... 408/189 |
| 2005/0084343 A1 | 4/2005 | Delett | |
| 2005/0260049 A1 | 11/2005 | Kruszynski et al. | |
| 2006/0222469 A1 | 10/2006 | Nuzzi et al. | |
| 2007/0036621 A1 | 2/2007 | Frank | |
| 2007/0067979 A1 | 3/2007 | Zumsteg et al. | |
| 2010/0303569 A1 | 12/2010 | Gonen et al. | |

FOREIGN PATENT DOCUMENTS

| | | |
|---|---|---|
| DE | 27 46 232 | 4/1979 |
| DE | 36 22 638 | 3/1987 |
| DE | 39 16758 | 12/1989 |
| EP | 0175011 | 3/1986 |
| EP | 0564425 | 10/1993 |
| JP | 58 126113 | 8/1983 |
| JP | 06-024811 | 4/1994 |
| JP | 2005161462 | 6/2005 |
| JP | 2006-082194 | 3/2006 |
| RU | 2071873 | 1/1997 |
| RU | 2129479 | 4/1999 |
| SU | 236948 | 11/1969 |
| SU | 596382 | 3/1978 |
| SU | 1313586 | 5/1987 |
| SU | 1757784 | 8/1992 |
| SU | 1808509 | 4/1993 |
| WO | 0205990 | 1/2002 |
| WO | 2004/087354 | 10/2004 |
| WO | 2008/154364 | 12/2008 |
| WO | 2009/069836 | 6/2009 |

OTHER PUBLICATIONS

International Search Report/Written Opinion for PCT/US08/66087 mailed Nov. 18, 2008.
ISCAR Popular DR Indexable Drills, Popular DR Indexable Drills Handle Larger Diameters, Press Release, web page address http://www.iscar.com/PressReleases/PressReleasesList.asp/CountryID/17/Menult/PressRelease, 2008, p. 1 of 1.
Korloy Inc., Drill Series, New Indexable Drill for Hole Making LPD & SPD & NPD, NPD Cartridge System, May 2008, p. 20 (pp. 1-22).

* cited by examiner

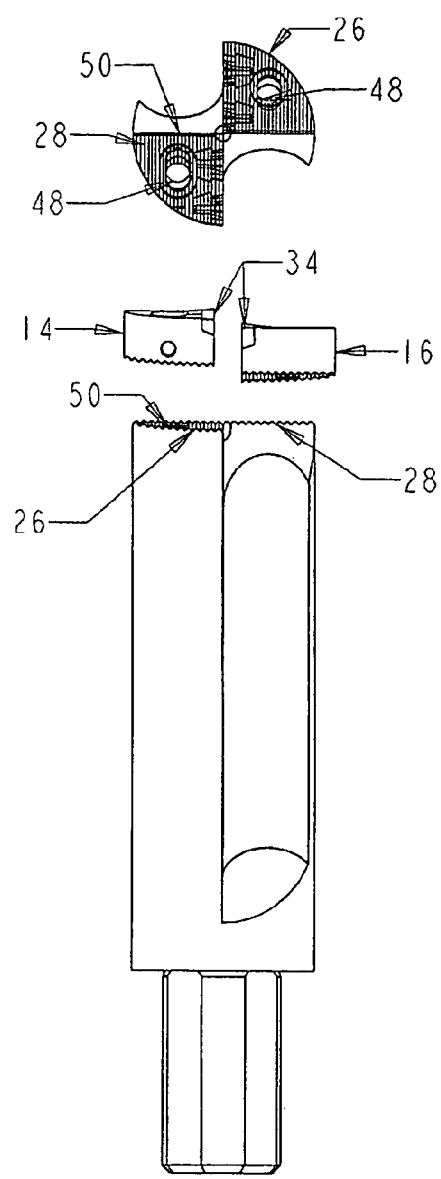
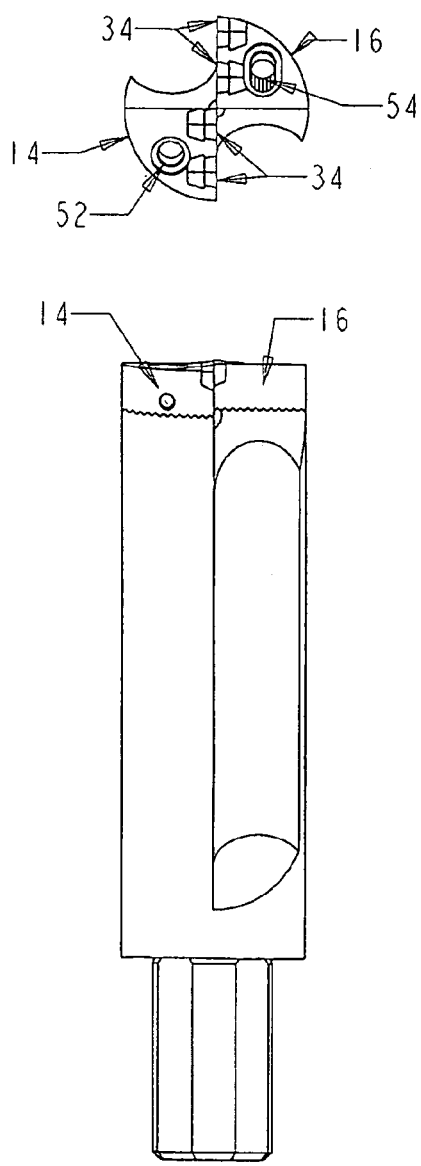
FIG. 4B
FIG. 4D
FIG. 4A
FIG. 4C

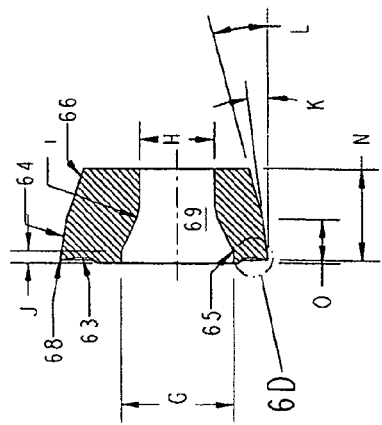
FIG. 6C
FIG. 6D
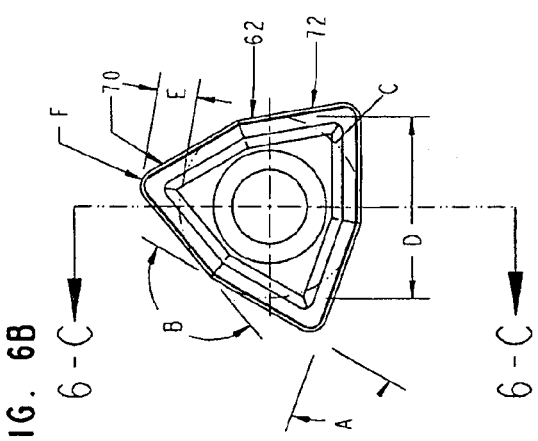
FIG. 6B
FIG. 6A

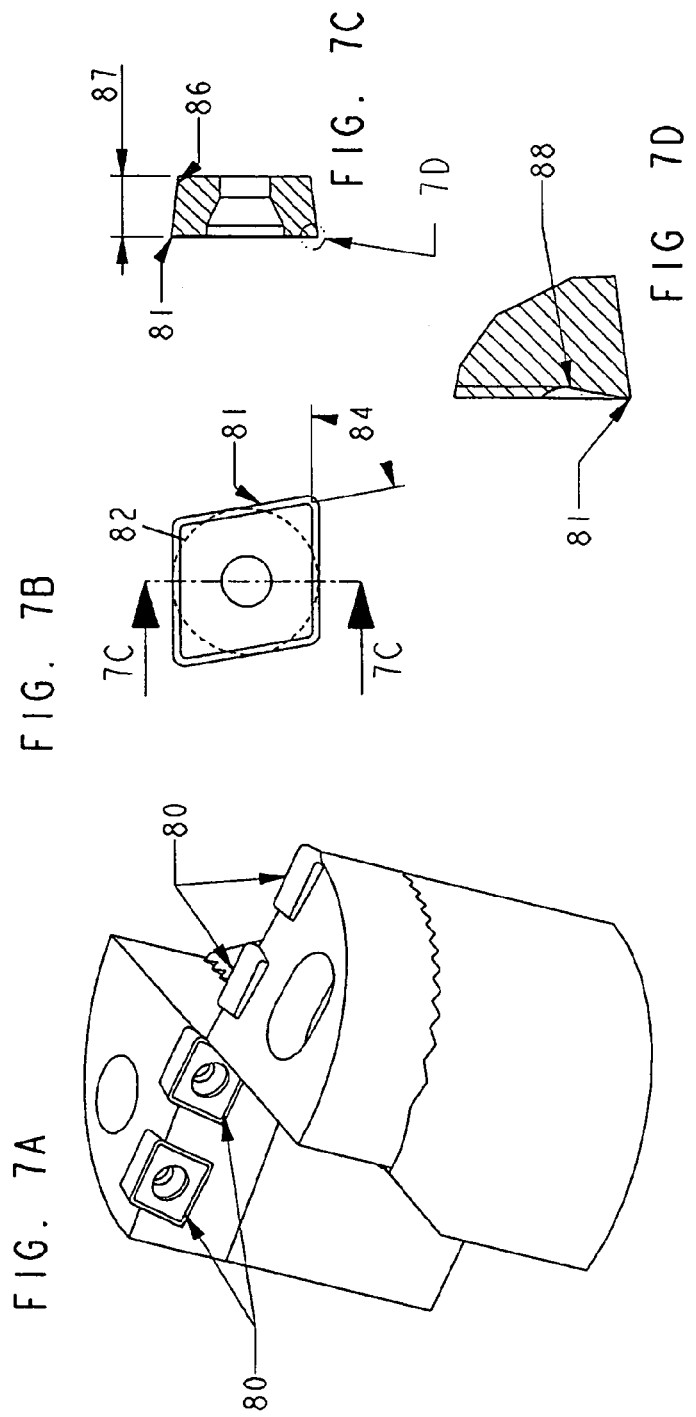

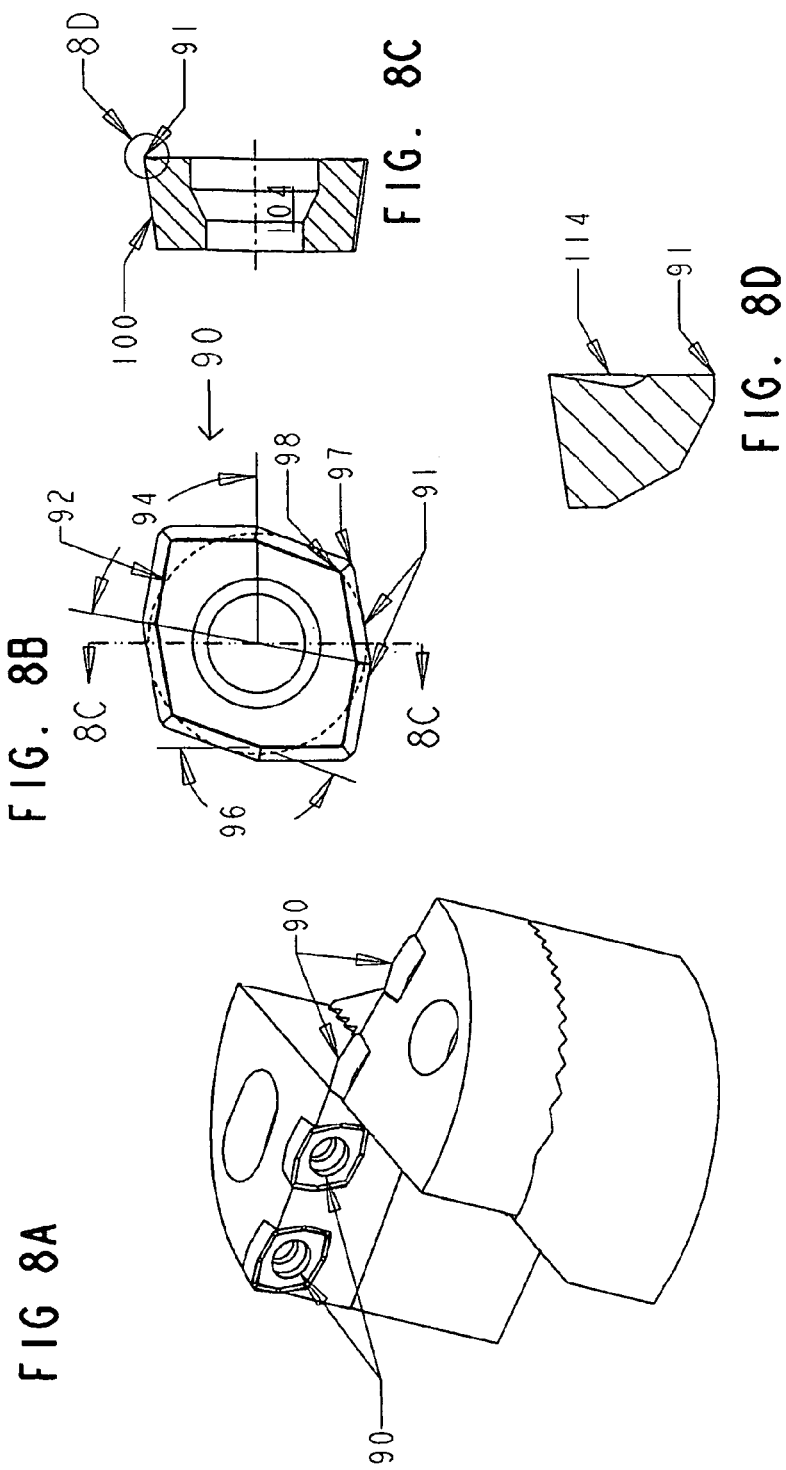

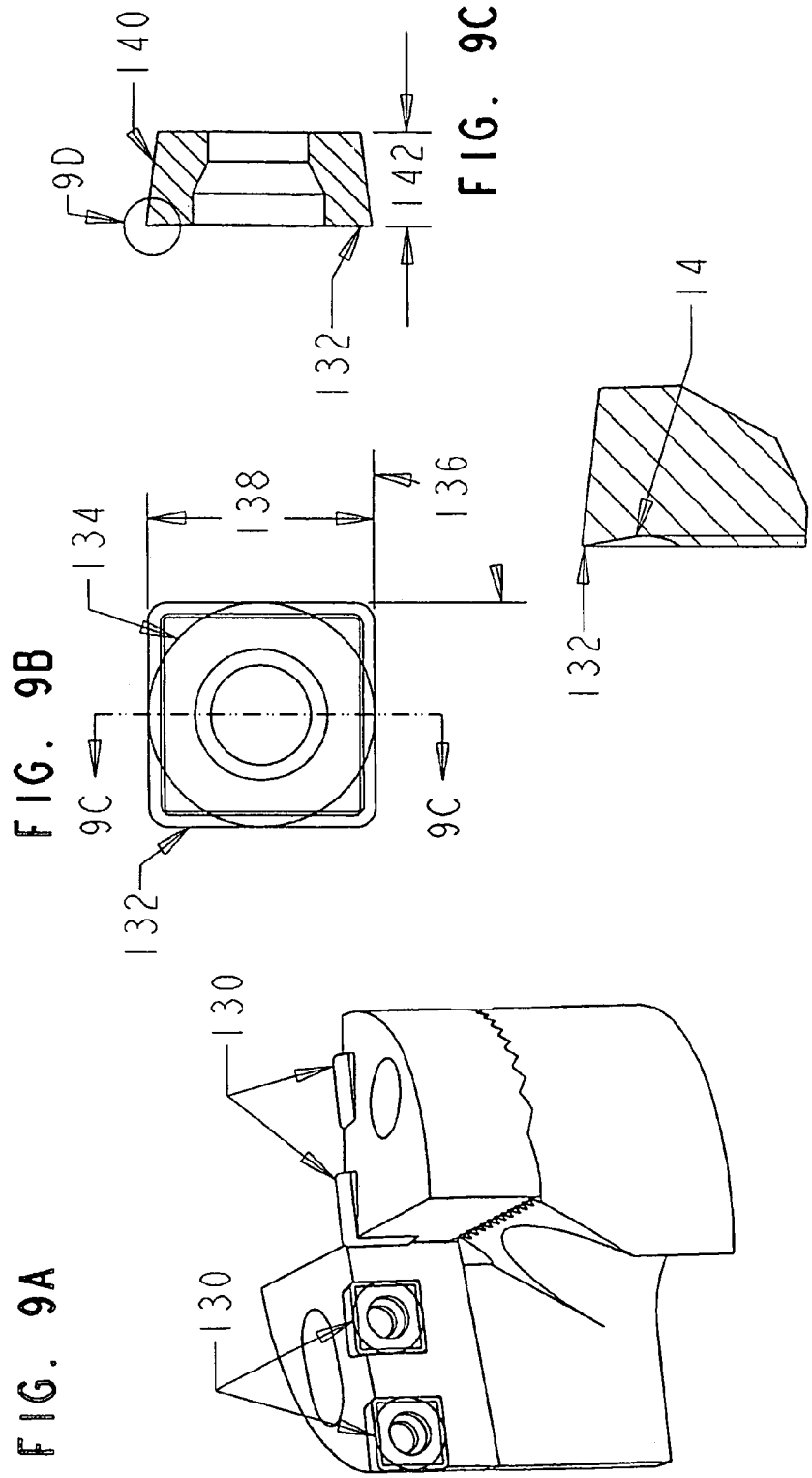

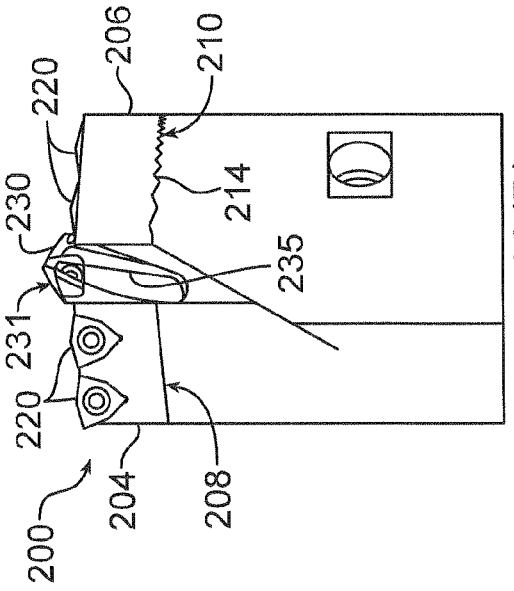
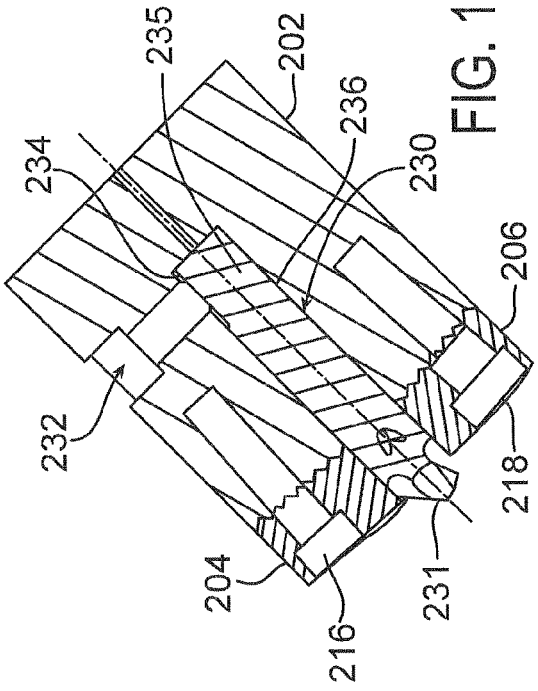
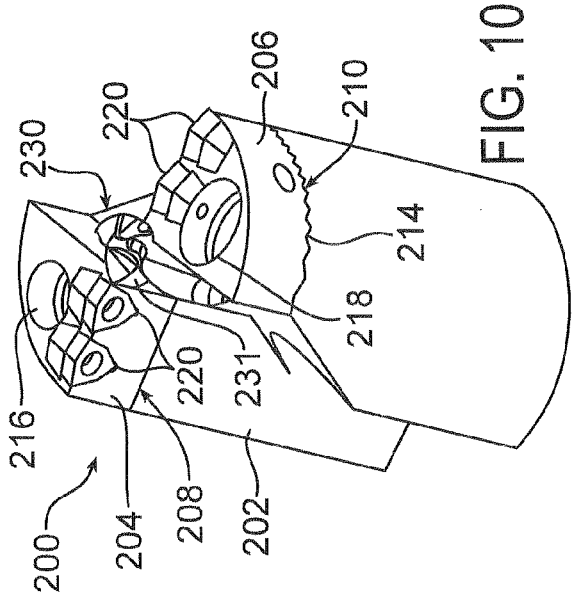
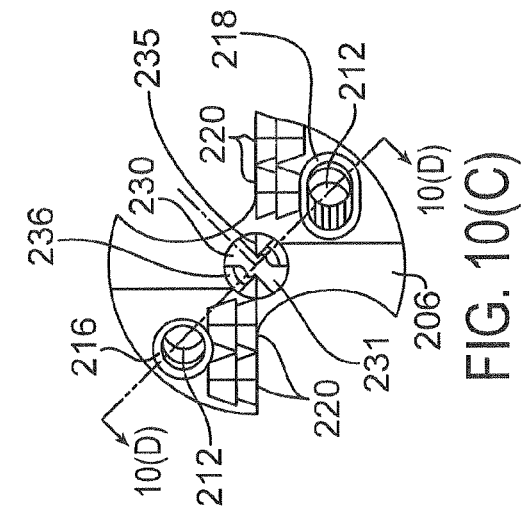

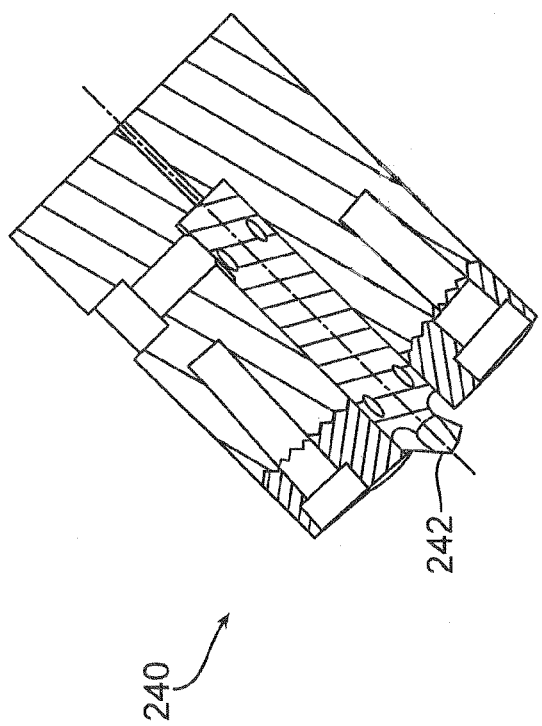

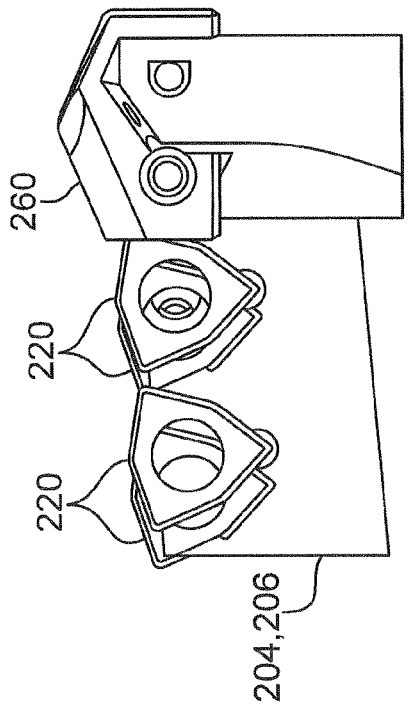
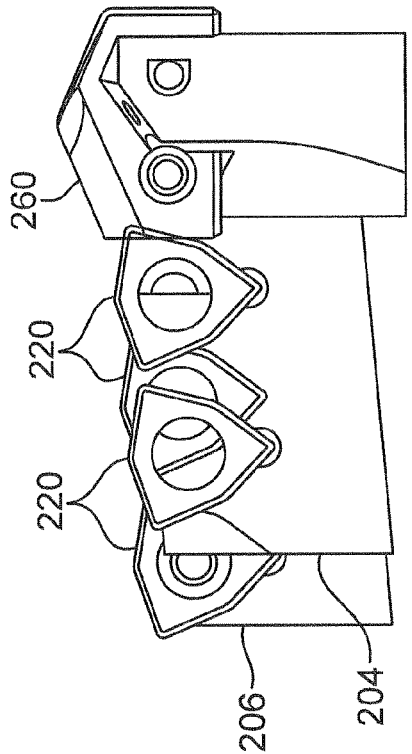
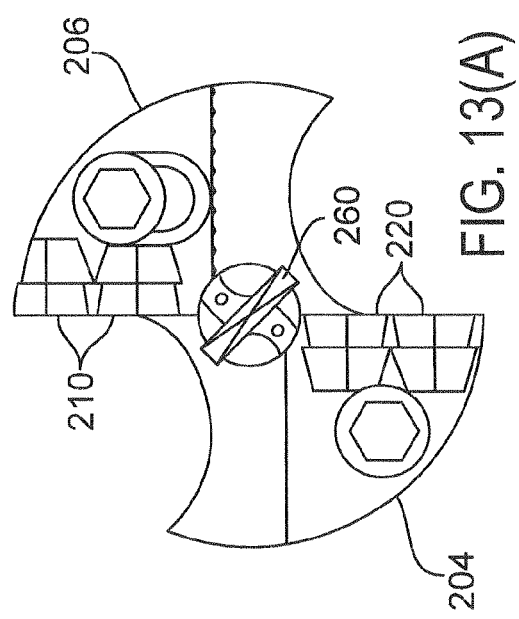
FIG. 13(A)
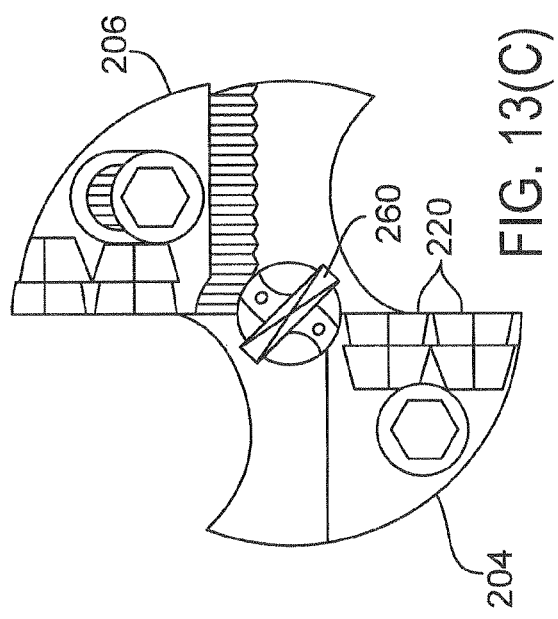
FIG. 13(C)

US 9,004,827 B2

ADJUSTABLE INDEXABLE DRILL AND MODULAR SYSTEM AND HOLDER

CROSS REFERENCE TO RELATED APPLICATIONS

This patent application is a continuation-in-part application claiming priority to U.S. patent application Ser. No. 12/558,981 filed Sep. 14, 2009, which is a continuation-in-part of U.S. patent application Ser. No. 12/209,931 filed Sep. 12, 2008, which is a continuation-in-part of U.S. patent application Ser. No. 12/134,766 filed on Jun. 6, 2008, which are incorporated herein by reference in their entirety. This application also claims the benefit of provisional application Ser. No. 60/942,493 filed Jun. 7, 2007.

TECHNICAL FIELD

The present invention generally relates to an indexable and adjustable size drill for producing a hole in a work piece.

BACKGROUND

Conventional twist type drills have been used for many years, generally being formed of hardened steel. Solid carbide drills provide desired strength characteristics for machining, but have various limitations. The development of drilling tools with indexable inserts overcomes some of these limitations. Indexable drills utilize cutting edges on one or more indexable, replaceable inserts. The inserts may be seated in pockets on the cutting end of a drill body. The pockets may have a shape corresponding to at least a portion of the shape of the insert. The inserts may be indexable, meaning that when the cutting edges wear in operation, the inserts may be removed or loosened from their position on the drill body, then rotated, or indexed, a pre-determined amount to enable use of additional cutting edges on the insert. At least one cutting geometry is associated with the insert, which may be on two or more index locations, such as for example an approximately triangle shaped insert having cutting geometry at three positions, an approximately square or other quadrilateral shaped insert having cutting geometry at four positions, or other suitable shapes. Inserts may be made of a material harder and/or denser than the drill body.

Indexable inserts may be capable of cutting feeds and speeds greater than a conventional twist type drill. Inserts may be carbide materials or similar materials that have a suitable hardness or may be hardened to provide a cutting edge with a hardness greater than the material being drilled. Indexable drills may be of a "one flute effective", "two flute effective" or multi-flute effective design, where one or more inserts are provided, each having one flute effective. Twist type drills generally have two effective flutes.

Although useful for many applications, indexable drills may not be as effective for smaller holes, for example ¾ inch (about 19 millimeters) or less as the design will typically be one flute effective. In operation, a single one flute effective indexable insert may be slower than a two flute effective twist drill or a two flute effective spade insert drills. Spade type inserts have a front "blade type" drilling point and may be of carbide construction or a fine grain tool steel.

As mentioned, indexable drills may utilize one or more replaceable inserts that are cost effective, particularly as the drill size gets larger or material gets more difficult to drill. An indexable drill may operate at a faster rotational speed, cutting greater surface area than a "spade type" drill, allowing a faster feed advancement. Another advantage of the indexable drill over a conventional spade drill, solid carbide drill, or conventional twist drill, is that the inserts are consumables. Instead of regrinding the cutting edge, the insert may be indexed to a new cutting edge and then thrown away when all the cutting edges are worn.

Indexable type drills are generally known in the art as a "roughing tool" because indexable drills may not be self-centering as in other type drilling products. Problems such as the insert flutes on an indexable not being a mirror of each other, as in spade drills or other products for example, causing non-uniform cutting forces in the operating drill. In the past, the drill may be held in the desired cutting path by a machine spindle, and the accuracy may be dependant on the rigidity of the machine and spindle, and the setup holding the part. For this reason, prior indexable drills may not be effective for drilling holes having a depth greater than 3 times the diameter. At depths greater than 3 times the diameter, the accuracy of prior art indexable drills may be reduced and the forces on the machine and machine spindle may become greater.

Indexable drills, or rough hole tooling, in the past have been made in rough hole size ranges. As the prior art drills increase in size, the difference in size from one drill to the next larger size may be about ¼ inch (about 6 millimeters) diameter or more. The end-user may have difficulty boring a hole in a single pass to a size between the prior art drill sizes. Until now, there has been little improvement in providing close drill tolerance holes in the larger drill sizes of about 1¼ inch to 5 inch (32 millimeter to 127 millimeter) and instead separate boring products are used to finish the rough hole.

Further, hole diameters between standard sizes in the past could be accommodated by special order drills. However, the lead time and expense of special order items can be high due to their low production volume, non standard size, and special engineering and sales involvement. The expense and time in obtaining these special size drills may dissuade the end user from purchasing a special drill and causing additional expense of added operations.

Also in past indexable drills, during operation, the physical cutting conditions for indexable insert drills may vary from the outside edge of the hole towards the center of the hole diameter, due to the different linear velocities of the cutting edges passing over the material. Near the center of the diameter, the linear velocity of the cutting edge may be very low. In prior indexable drills, at the low linear velocity of the center, the mechanical cutting action may be like a chisel that extrudes material. As the distance from the center increases, the linear velocity of the inserts increase, and the cutting edges may effectively shear the material. In the past, the low linear velocity at the center of the hole can cause a drill failure. To accommodate the low linear velocity at the center of the hole, drills of the prior art have attempted to utilize a center-cutting insert having a different shape, or insert material, or a special cutting edge.

Also, as the prior drills increase in size, the drill may be configured with larger sized inserts. As the insert size and shape become larger, the insert screw that retains the insert in its pocket may also change. A user having many hole sizes to create must carry a large inventory of inserts, grades of inserts, and screw sizes. The end user having holes ranging as little as 1.5 inches (38 millimeters) from the smallest to the largest, may have as many as 30 to 45 separate components to inventory.

Drills that are not balanced can cause chatter. Because indexable inserts may not be two flute effective and may not be uniform, prior indexable drills have been difficult to balance. In the past. indexable inserts have been honed or made with flat ground cutting edges to protect the edges from chatter or movement common in the prior art indexable drills. For this reason, more power was required for past drills with the honed or flat ground insert edges used in the prior art.

Indexable drills in the prior art also rely on a volume of coolant to expel the drilling chips from the hole during drilling. The chips created by the cutting action have to move back from the cutting edges and be expelled from a gullet adjacent the cutting area to keep chips from wedging in the clearance between the drill body and the cut diameter. Coolant may be pumped through the drill body, exiting on the drill end and flowing backward through pressure and momentum and pushing the chips backward up the gullet. The coolant may include a water soluble oil that may form a mist under heat and pressure of cutting. The coolant may be a health hazard to an operator when breathed and has to be contained thru filtration or other processes to reduce the airborne inhalation by machine operators.

In past indexable drills, the drill failure point may be near the center insert area. The center area may pack with chips unable to move back and over drill body structure, and out of the formed hole.

SUMMARY OF THE DISCLOSURE

The present invention relates to an adjustable drill comprising a drill body having a longitudinal axis, comprising a face surface comprising an aperture extending into the drill body; a directional feature adjacent the aperture extending toward an edge of the drill body; a longitudinal gullet extending from the face surface along at least a portion of the drill body; a cartridge adjacent the face surface and selectively slidable along the directional feature comprising: a slot along the directional feature; and a cutting face comprising an insert pocket positioned adjacent the edge of the drill body; a fastener through the slot into the aperture releasably affixing the cartridge to the drill body; and an insert releasably affixed in the insert pocket.

The adjustable drill may further comprise a second face surface comprising a second aperture extending into the drill body; a second cartridge adjacent the second face surface comprising a through hole; and a second cutting face comprising an insert pocket positioned adjacent the axis of the drill body; a fastener through the hole into the second aperture releasably affixing the cartridge to the drill body; and an insert releasably affixed in the insert pocket.

The adjustable drill may further comprise inserts of different configurations which may provide alternative cutting characteristics in conjunction with the adjustable drill.

In an alternative embodiment, the adjustable drill may further include a centrally positioned drilling insert that allows for increased stability during operation of the drilling system, while still allowing indexability by means of the insert configurations. In alternative embodiments, the system may comprise a modular system including a replaceable insert for use in conjunction with a holder, for positioning the insert at a central location to facilitate drilling in conjunction with adjustable indexable inserts. The system may also comprise a modular holder arrangement to provide flexibility in operation for various applications.

The at least one cartridge and corresponding face surfaces of the holder may also include dovetail portions to lock the cartridges to the face surfaces in an example.

BRIEF DESCRIPTION OF THE DRAWINGS

FIG. 4A is a side view of a portion of the drill of FIG. 1;

FIG. 4B is a top view of the portion shown in FIG. 4A;

FIG. 4C is a side view of the drill of FIG. 1;

FIG. 4D is a top view of the drill shown in FIG. 4C;

FIGS. 6A-6D show views of an example of a trigon insert usable in conjunction with the present disclosure;

FIGS. 7A-7D show views of an example of the drill with an alternative insert configuration;

FIGS. 8A-8D show views of an example of the drill with an alternative insert configuration; and FIGS. 9A-9D show views of an example of the drill with an alternative insert configuration.

FIGS. 10A-10D show views of an alternate embodiment of the invention having a centrally disposed cutting insert in association therewith.

FIG. 11 shows a cross sectional view of an alternate embodiment similar to FIG. 10.

FIGS. 13A-13D show partial views of an embodiment having a centrally disposed cutting insert with the smallest and largest cutting diameters are shown.

DETAILED DESCRIPTION OF THE DRAWINGS

Figure 1:
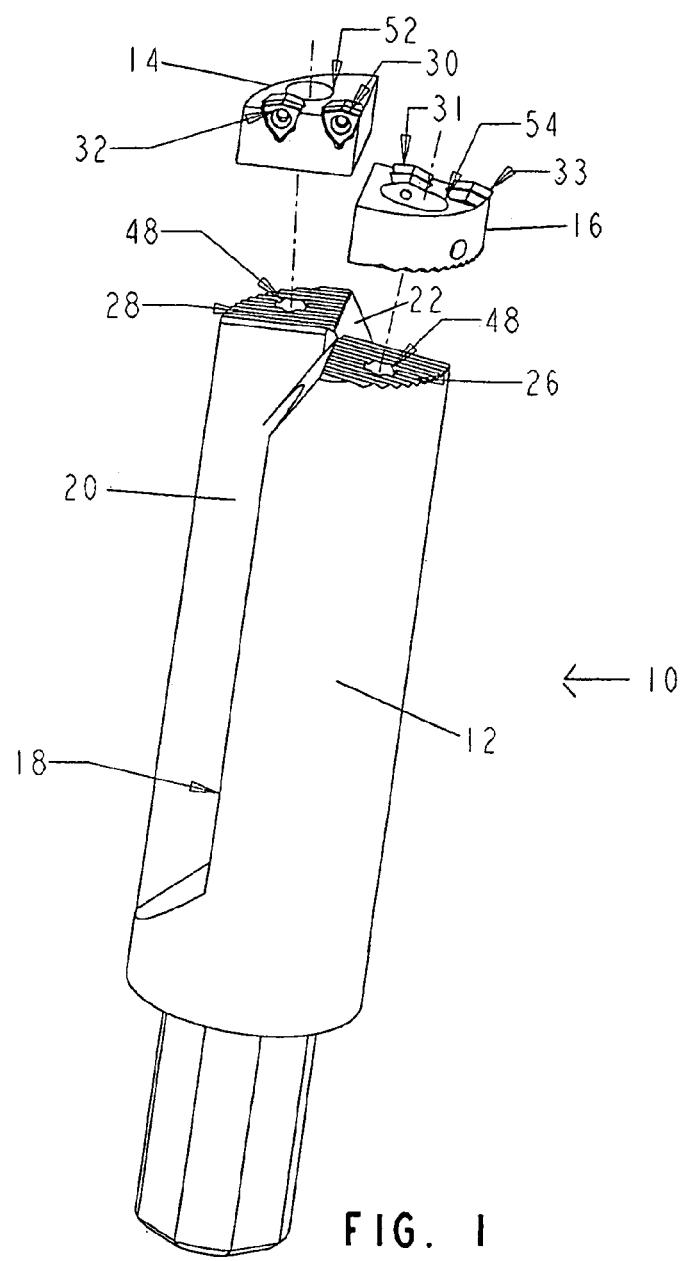
FIG. 1 is an exploded perspective view of an adjustable indexable drill of the present disclosure with portions removed for clarity.

The invention relates to an adjustable indexable drill, with an example presently disclosed, wherein the drill may utilize one or more insert cartridges and indexable cutting inserts. In this example, the indexable inserts drill alleviates many of the deficiencies of indexable drills previously described, and provides increased performance efficiency, reduced cost of operation, and elimination of unnecessary operations. The indexable insert drill also reduces the coolant necessary for proper operation, thereby reducing hazards to operators related to possible inhalation of such coolant materials. As will also be described, the indexable inserts drill provides for smooth, stable entry into a part being machined, thereby allowing stable operation for forming close drill tolerance holes of the desired configuration. Referring now to FIG. 1, an adjustable indexable drill 10 may comprise a drill body 12, an inboard cartridge 14, and an outboard cartridge 16. Various structures, such as cap head screws for securing the cartridges 14 and 16, and inserts described hereafter, are not shown in FIG. 1.

The drill body 12 may have an approximately cylindrical shape, and may comprise one or more longitudinal gullets 18, each gullet 18 having a leading surface 20 and a trailing surface 22. The leading surface 20 and trailing surface 22 may be about 90 degrees apart. Alternately, the leading surface 20 and trailing surface 22 may be more or less than 90 degrees apart. An end of the drill body 12 may comprise a first face surface 26 and a second face surface 28. The longitudinal gullets 18 may extend from the face surfaces 26, 28 along at least a portion of the drill body 12. One or more insert cartridges may be used with the drill body, such as insert cartridges 14, 16, which may be affixed to the drill body 12 adjacent the face surfaces 26, 28.

The drill 10 may use multiple cutting inserts 30 for reducing chip size. The inserts may be positioned such that the cutting paths of the inserts overlap. As the drill diameter increases beyond the ability of the cutting paths to overlap each other correctly, additional inserts may be used. At least one cutting insert 30 may be affixed to each insert cartridge 14, 16. FIGS. 1 through 5 show adjustable indexable drill 10 utilizing four or more cutting inserts 30, 31, 32, 33 for illustrative purposes. It may be possible for some applications to use fewer than four inserts. In an aspect of the invention, the drill has the ability to be adjusted within a size range. The adjustability as an example as provided by allowing outboard cartridge 16 to be movable, and positioned opposite a fixed insert cartridge 14 at substantially 180°. The adjustability of the movable cartridge allows adjustment of the drilling size for accurate adjustment of the drill to a particular hole size requirement. The adjustability also allows for compensation of worn machine spindles, worn tool holders or poor setup conditions. The ability to drill a finished hole in a single operation eliminates additional boring and reaming operations, while achieving the desired finish hole size. This in turn reduces the drilling and boring inventory which is necessary for a particular application, as the drill size range eliminates the need for additional boring or reaming tools as well as reduces the need for specially built drill sizes. This also eliminates the lead time and expense of such custom-made items. As the desired hole diameter increases, additional inserts may be used, such as for example but not limited to six inserts or eight inserts. Conversely, as the desired hole diameter decreases, fewer inserts may be used, such as for example but not limited to two or three inserts. The cutting inserts 30, 31, 32, 33 comprise cutting geometry that may include cutting edges 40, 41, 42, 43, with an apex 44 formed thereon. The apex in the example shown is provided by cutting edges extending at an angle therefrom, such as about 20 degrees. The inserts may be indexable for providing one or more additional cutting edges 40', 41', 42', 43'.

The inboard cartridge 14 may comprise a cutting face comprising an insert pocket positioned adjacent the axis of the drill body. The cutting insert 30 may be affixed in the insert pocket on the inboard cartridge 14 such that the cutting edge 40 is capable of cutting the centermost portion of the hole diameter.

The outboard cartridge 16 may comprise a cutting face comprising an insert pocket positioned adjacent the edge of the drill body. The cutting insert positioned for cutting the outermost portion of the hole diameter may be affixed to the insert pocket on the outboard cartridge 16. The cutting face on the outboard cartridge 16 may be about 180 degrees from the cutting face on the inboard cartridge.

Figure 2:
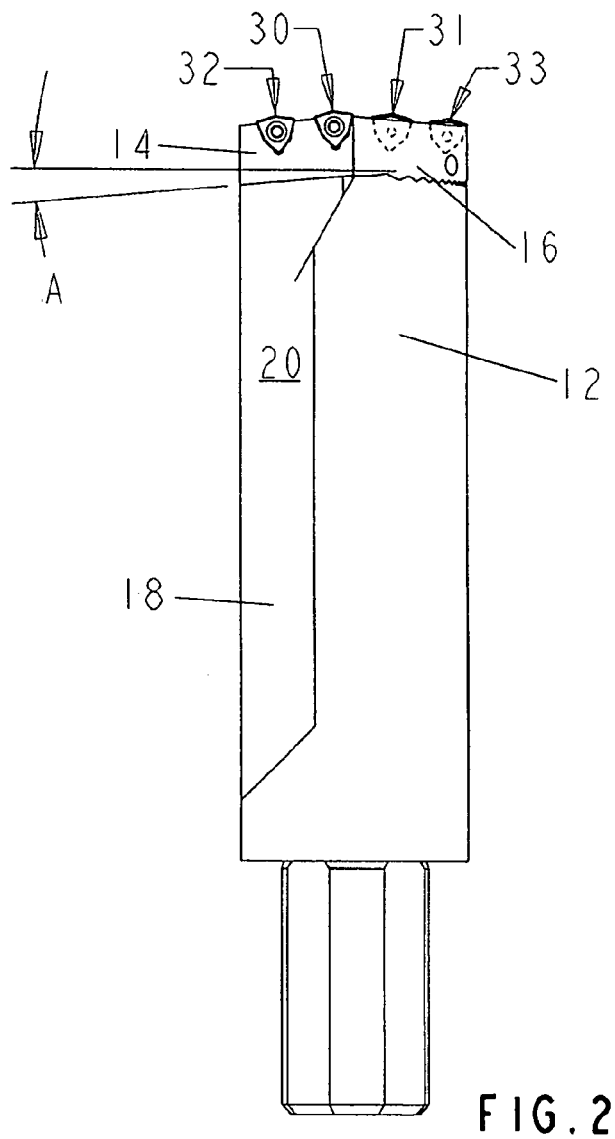
FIG. 2 is a front view of the drill of FIG. 1.
Figure 3:
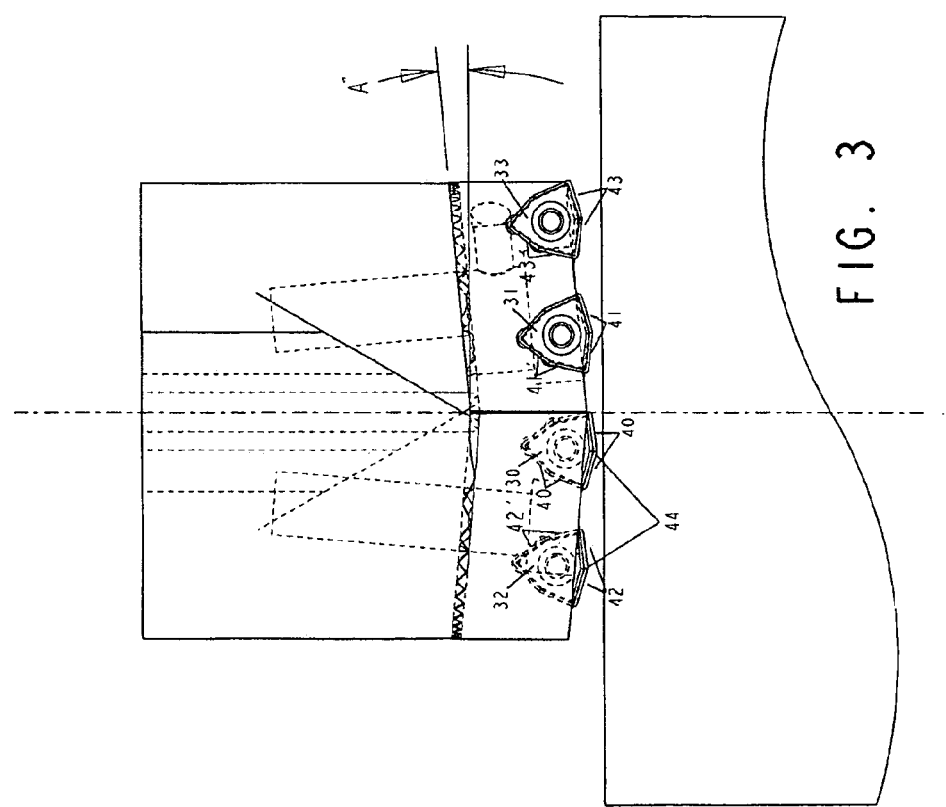
FIG. 3 is a partial view of cartridges and inserts of the drill of FIG. 1.

The first and second face surfaces 26, 28 may be angled surfaces. As shown in FIGS. 2 and 3, the face surfaces 26, 28 may be angled at an angle A away from a perpendicular plane by a predetermined amount, such as about 2 to 5 degrees. Alternately, the face surfaces 26, 28 may be angled away from a perpendicular plane by about ½ to 10 degrees or greater. One or both face surfaces 26, 28 may be angled such that a normal vector of the face surface remains parallel to the gullet leading surface 20. Alternately, the face surfaces may have an oblique orientation. The sloping of surfaces 26 and 28 provides for smooth entry into a part surface, and facilitates stabilization of the drill during use. This also provides the function of allowing the center insert, which in this example is insert 30, and particularly the apex 44 thereof, to begin forming a track in the cutting path as the opposite or next inboard insert enters the part. The configuration allows the drill to begin to track at this point before the outer inserts begin to cut, thereby providing smooth and stable entry into the part. Angling the face surfaces 26, 28 away from the perpendicular plane positions the affixed insert cartridges 14, 16 on a corresponding angle, thereby resulting in the cutting edges 40, 41, 42, 43 to be positioned such that the inner cutting edge 40 extends outwardly to the greatest extent, with subsequent inserts being positioned away from the front of the drill. This positioning of inserts 30, 31, 32 and 33 allows each successive insert to effectively begin forming a cut, or track, before the next insert begins to cut, and so forth until each insert is engaging the part. The center insert 30 therefore begins a slight tangential loading before insert 31 begins cutting, and similarly in turn for inserts 32 and 33. The smooth entry into the part avoids wobble which may cause catastrophic rebounding in drilling with one insert effective drilling systems.

The first and second face surfaces 26, 28 may comprise a drive feature adjacent the aperture, or hole 48, extending toward an edge of the drill body, such as for example but not limited to one or more longitudinal serrations or longitudinal keyways or other geometry capable of restraining the cartridges 14, 16 when installed on the face surfaces 26, 28. As shown in FIGS. 4A and 4B, the first and second face surfaces 26, 28 may comprise a drive feature, such as serrations 50 over at least a portion of the face surfaces. As shown in this example, the serrations are 60 degree serrations, but other angle serrations may be suitable as desired. Alternatively, a drive key type of arrangement could be used or any other suitable drive configuration. The inboard cartridge 14 and the outboard cartridge 16 may have corresponding geometry for engaging the restraining geometry on the face surfaces 26, 28, such as corresponding serrations, drive keyways or other geometry capable of restraining the cartridges 14, 16 when installed on the face surfaces 26, 28 as seen in FIGS. 4C and 4D. The drill body 12 may have apertures extending into the drill body, or holes 48, for receiving screws or fasteners, such as cap head screws (not shown) for affixing the cartridges 14, 16. The cartridges 14, 16 may be releasably affixed to the drill body 12 by fasteners such as for example but not limited to screws or other fasteners. The fasteners may be socket head cap screws. This design allows the cartridges 14 and 16 to be selectively replaced, to allow effective replacement of the front cutting surfaces associated with the drill assembly, in a simple and effective manner. The design of the present invention also allows the distance from the drill body transition to the cutting insert pockets 34 to be kept short, to reduce any bending moments on the inserts. The distance from the end of the drill body 12 to the cutting edge 40 may be in a range of about ½ to 1 inch (about 12 to 25 millimeters). Alternately, the distance from the end of the drill body 12 to the cutting edge 40 may be in a range of about ¾ to 2 inch (about 19 to 51 millimeters). Supporting the cartridges close to the cutting edge tends to reduce forces in the drill 10.

Figure 5:
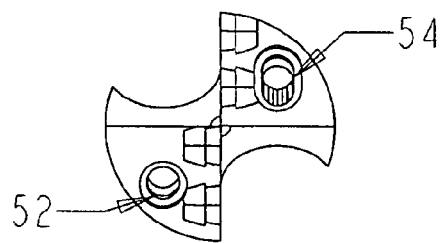
FIG. 5 is a top view of the drill of FIG. 1.

The inboard cartridge 14 and the outboard cartridge 16 may have apertures through the cartridges for affixing the cartridges to the drill body. As shown in FIGS. 4B and 5, an aperture 52 through the inboard cartridge 14 and aperture 54 through the outboard cartridge 16 may comprise a counterbore to provide clearance for a screw head or other fastener feature. For example, cap head screws (not shown) may be used to fasten the cartridges 14 and 16 via apertures 52 and 54, and in association with apertures formed on the face sides 26 an 28. The position of mounting apertures 48, 52, 54 may allow a user to install the cartridges from the face end of the drill. By positioning the mounting apertures 48, 52, 54 toward the face end of the drill, a user may be able to remove the cartridges while the drill is positioned in a machine spindle, which may save time for the user.

Alternately, one or more of the cartridges may be integrated into the drill body (not shown).

The gullet 18 may have a shape that opens the gullet to allow less impedance to the chip flow. The leading surface 20 of the gullet may be approximately flat. The trailing surface 22 may be an elliptical concave surface as shown in FIG. 1. The elliptical trailing surface 22 may reduce the amount of coolant pressure and flow required to evacuate the chip rearward and away from the cut. Reducing coolant pressure and volume may reduce the amount of misting of the coolant to be contained by filtration or other processes. For some materials, the indexable drill 10 may enable dry cutting.

The cutting inserts 30, 31, 32, 33 may be positioned in pockets or cavities cut into the inboard and outboard cartridges 14, 16. The pockets may be shaped to correspond to at least a portion of the shape of the inserts. Further, the pockets may be shaped such that the inserts are angled with respect to a surface of the cartridges. The rotation of the insert pocket outward of the 20 degree apex may reduce "push off" of the center insert caused by the lower linear velocity of the insert near the centerline of the hole, such as by 1.5 to 2.75 degrees from perpendicular for example. Other amounts of rotation are contemplated as may be desired for various applications.

The drill 10 may be adjustable to different diameters within a size range. The outboard cartridge 16 may be a movable cartridge adjacent the face surface and selectively slidable along the directional feature. As shown in FIGS. 4B and 5A, the aperture 54 may be a slot along the direction of serrations 50. The slot may be sized to allow translation of the outboard cartridge 16 about $\frac{1}{16}$ to $\frac{1}{2}$ inch (about 1 to 12 millimeter) or more for larger drill bodies 12. Alternately, the slot may be sized to allow translation of the outboard cartridge 16 about $\frac{1}{8}$ to $\frac{1}{4}$ inch (about 2 to 6 millimeters). Other amounts of translation are contemplated as may be desired for various applications. In operation, to adjust the outboard cartridge 16, the fastener affixing the cartridge to the drill body may be loosened, allowing the cartridge to slide or translate the length of the slot. When the cartridge is positioned as desired, the fastener may be re-tightened to affix the cartridge to the drill body.

An adjustment to the drilling diameter may allow the end user to adjust the drill to accommodate various hole diameters. Adjustability allows for the user to compensate for worn machine spindles, worn tool holders, or poor setup conditions. The drill adjustment may also reduce costly secondary operations such as boring or reaming after drilling. The adjustability feature may also reduce the amount of drilling and boring tool inventory maintained by a manufacturing facility. Further, the adjustability feature may also reduce the need for expensive special order drill sizes. As an example, a family of drill systems may be provided in overlapping drill sizes, which for inserts as described in examples herein, may be in the range of approximately 0.200 inches on diameter to enable the hole drilling of a virtually infinite amount of hole sizes. For smaller hole configurations, the adjustability provided by the tool according to the invention may be smaller, such as in the range of about 0.125 inches for example. In general, the degree of adjustability may be of alternative ranges as may be desired, such as in the range of $\frac{1}{16}$ to $\frac{1}{2}$ inch for example. The ability to provide adjustment according to the invention thereby allows desired finish hole sizes to be produced.

The adjustable indexable drill 10 may use multiple inserts that may distribute cutting forces over a cut width, with a slightly thicker insert. The insert edge has more free cutting rake or inclination that is allowed by the stability of the drill. By eliminating honed edges and strengthening the cutting area, less power may be used to drill the hole, providing a savings to the user. Smaller insert sizes may also use less material in the cutting tool insert. The one or more cutting inserts may be fastened to the at least one cartridge, such as cartridges 14 and 16, in any suitable manner, such as by cap head screws (not shown) or the like.

Turning to FIG. 6, there is shown in FIGS. 6A-6D in more detail a trigon type of insert 60 that may be used in the drill according to the examples of the invention. In FIG. 6, the trigon insert 60 includes three sides 62 having first and second portions 64 and 66, with portion 64 forming a cutting edge 68 and relief surfaces at about 7 and 15 degrees respectively, as shown in the cross-sectional view. A central aperture 69 for a fastening member is provided. As seen in FIG. 6B, the sides 62 may be angled at a desired angle relative to an adjacent side 62, such as oriented at angles A of about 80 degrees plus/minus 0.5 degrees, and each include two sections 70 and 72 angled at a desired angle B, such as oriented at an exterior included angle of about 160 degrees as shown in this example. The cutting edges 68 are provided on each surface 62, extending from the axial center of the side 62. The cutting edges 68 are substantially tangent to inscribed circle C from dead center of insert 60. The diameter of circle C may be of a desired dimension D, such as 7.938 plus or minus 0.05 mm as an example. A radius F may be provided between sides 62, such as a radius of 0.787 mm for example. The cross section shown in FIG. 6C is taken along line 6C-6C of FIG. 6B. As shown in this FIG., the aperture 69 has a desired configuration for mating with an attachment screw, with an outboard dimension G, such as a dimension of 4.93 plus or minus 0.07 mm, and an inboard dimension H, such as a dimension of 3.23 plus or minus 0.07 mm. A radius I may be formed at a midpoint of aperture 69, such as a radius of 2.362 for example. At the outboard side, the aperture 69 may have a portion 65 having a counterbore J of 0.51 plus or minus 0.07 mm for example. A radius may be formed between portion 65 and the adjacent portion of the aperture 69, such as a radius of 0.203 for example. The surfaces 64 and 66 may be formed at desired angles to the cutting edge 68, such as at a first primary clearance angle K for surface 64, such as 7 degrees, and a secondary clearance angle L for surface 66, such as 15 degrees. If desired, only a primary clearance surface may be used. In this example, the dimensions of the primary and secondary clearance surfaces 64 and 66 may be selected as desired. The insert 60 may have a desired thickness N, such as 3.96 plus or minus 0.02 mm, with surface 64 having a dimension O, such as 1.905 mm. In this and other examples, the inserts are designed to have a larger thickness dimension than ISO standard thicknesses, to provide strength and durability. For example, the thickness is at least 0.4 mm greater than the international standard thickness. The enlarged partial section of FIG. 6D, taken at section 6D of FIG. 6C, shows the detail of the cutting edge portion 68 and chip breaker surface 63. The cutting edges 68 may include a plurality of cutting components, which cooperate together to provide the desired cutting surface for the material and/or drilling application. In general, the insert 60 is designed to cut when rotationally driven in conjunction with holder in a predetermined direction. The insert aperture 69 cooperates with an aperture in the inboard cartridge 14 or the outboard cartridge 16 to secure insert 60 within a pocket on the cartridges 14 and 16 for example. The aperture 69 may be formed with countersunk portions formed as a bearing surface adapted to be engaged by a corresponding tapered or like surface on a fastening member such as a screw or the like, and the aperture 69 and corresponding aperture in a cartridge 14 or 16 may be offset, such that upon securing insert 60 within a pocket, the insert 60 will be forced against seating surfaces in the pocket. Adjacent the cutting edges 68 of each side 62, the cutting lip or chip breaker surfaces 63 are formed as seen in FIG. 6D, to form desired chip forming and breaking surfaces in conjunction with the cutting edge 68. Other aspects of a particular type of trigon insert are noted in these Figs, but it should also be understood that other trigon or trochoid inserts may be formed differently so as to be suitable for use for various applications if desired. In this example, the particular trigon insert 60 has an isometric configuration and has a predetermined included angle which may vary in accordance with the size of the drilling tool if desired. The insert 60 also has primary and secondary clearance surfaces, but it should also be understood that other configurations are contemplated.

In FIGS. 7A-7D, a diamond shaped insert 80 is shown as an example of an insert usable in the drilling system. The diamond shaped insert 80 is seen to have four sides with each having a cutting edge 81 associated therewith. In this example of a diamond shaped insert 80, as seen in FIG. 7B, the cutting edges 81 may be formed to be tangent to an inscribed circle 82, such as having a ⅜ inch diameter. The cutting edges 81 are also formed at a predetermined angle 84 to one another, such as an angle of 80 degrees. As seen in FIG. 7C, showing a cross section taken along line 7C-7C of FIG. 7B, a primary clearance surface 86 is formed behind the cutting edges 81, and the insert has a thickness 87, such as about 0.1563 mm. An enlarged detail of a cutting edge 81 is shown in FIG. 7D, showing a chip breaking surface 88 formed adjacent the cutting edge 81.

In FIGS. 8A-8D, a quadron shaped insert 90 is shown as an example of an insert usable in the drilling system. The quadron shaped insert 90 is seen to have four sides with each having several cutting edges 91 associated therewith. In this example, the quadroon insert 90 is formed to have a rhombus-type shape. As seen in FIG. 8B, the quadron insert 90 may have a plurality of cutting edges formed to be tangent to an inscribed circle, such as having a diameter 92 of 0.3750 for example. The cutting edges 91 may be formed to be positioned at a desired location relative to the centerline of each side of the quadron insert 90, such as positioned at an angle 94, for example at an angle of 80 degrees, to one another, such that the insert cutting edges 91 are skewed from the centerline of the insert 90 when positioned in a corresponding pocket 34 in a cartridge 14 or 16. Each side of the quadron insert 90 may be configured to have the cutting edges 91 formed at an included angle 96 to one another, such as at an angle of 160 degrees for example. As shown in FIG. 8C, there may be provided a primary clearance surface 100 adjacent each cutting edge 91, formed at an angle 102 such as an angle of 8 degrees for example. The attachment hole 104 may be configured to allow attachment as desired. As seen in FIG. 8D, there may be a chip breaking surface 114 formed adjacent each cutting edge 91.

In FIGS. 9A-9D, a square shaped insert 130 is shown as an example of an insert usable in the drilling system. The square shaped insert 130 is seen to have four sides with each having a cutting edge 132 associated therewith. As seen in FIG. 9B, the cutting edges 132 may be formed tangent to an inscribed circle 134 having a predetermined diameter, such as a ⅜ inch diameter for example. The cutting edges are formed at an angle 136, which for a square insert 130 is 90 degrees. The insert 130 may have a side dimension 138, such as 0.3750 for example. As shown in FIG. 9C, there is a primary relief surface 140 formed at a predetermined angle, such as an angle of 8 degrees, with details of the attachment hole similar to the quadron insert mentioned previously for example. As seen in FIG. 9D, there may be a chip breaking surface 144 formed adjacent each cutting edge 132.

The types of inserts shown in FIGS. 6-9 are examples of types which may be suitably used, but other configurations are also contemplated, while providing indexability between the cartridges in which they are positioned.

A further embodiment of the invention is shown in FIGS. 10A-10D, wherein the adjustable drill may further include a centrally positioned drilling system 230 that allows for increased stability during operation of the drilling system, while still allowing indexability by means of the outer insert configurations. In the embodiment as shown in FIG. 10A, the tool 200 comprises one or more insert cartridges similar to prior embodiments, such as insert cartridges 204, 206, which may be affixed to the drill body 202 adjacent the face surfaces 208, 210. Alternately, one or more of the cartridges may be integrated into the drill body (not shown).

The drill 200 may use multiple cutting inserts 220. The inserts 220 may be positioned such that the cutting paths of the inserts overlap as in prior embodiments, with more or less inserts usable depending on the drill diameter. At least one cutting insert 220 may be affixed to each insert cartridge 204, 206. As in prior embodiments, FIGS. 10A-10D show an adjustable indexable drill 200 utilizing four or more cutting inserts, but fewer or more than four inserts may be used. The drill 200 has the ability to be adjusted within a size range, with the adjustability as in prior examples, provided by allowing outboard cartridge 206 to be movable, and positioned opposite a fixed insert cartridge 204 at substantially 180°. Instead of being fixed, the cartridge 204 could also be made to be movable. The adjustability of the at least one movable cartridge allows adjustment of the drilling size for accurate adjustment of the drill to a particular hole size requirement. The cutting inserts 220 comprise a desired cutting geometry, and may be indexable for providing one or more additional cutting edges.

The inboard cartridge 204 and outboard cartridge 206 may comprise a cutting face comprising an insert pocket positioned adjacent the axis of the drill body. The cutting inserts 220 may be affixed in the insert pockets such as in prior examples. The cutting face on the outboard cartridge 206 may be about 180 degrees from the cutting face on the inboard cartridge 204.

The first and second face surfaces 208 and 210 may be angled surfaces, such as described in prior examples. One or both face surfaces 208 and 210 may be angled in alternative manners as in prior examples, such as having a normal vector of the face surface which remains parallel to the gullet leading surface, or alternately, the face surfaces may have an oblique orientation.

As in prior examples, the first and second face surfaces 208 and 210 may comprise a drive feature to drive the cartridges 204 and 206, such as serrations 214 over at least a portion of the face surfaces, a drive key type of arrangement or any other suitable drive configuration. The inboard and outboard cartridges 204 and 206 may have cooperating structures or geometry for engaging the drive feature associated with the face surfaces 208, 210, such as corresponding serrations, drive keyways or other suitable structures or geometry. The drill body 202 may have apertures extending into the drill body, or holes 212, for receiving screws or fasteners, or other suitable arrangement for affixing the cartridges 204 and 206 may be used. The cartridges 204 and 206 may be releasably affixed to the drill body 202 by fasteners such as for example but not limited to screws or other fasteners. This design allows the cartridges 204 and 206 to be selectively replaced, to allow effective replacement of the front cutting surfaces associated with the drill assembly for example. The design similar to prior examples, allows the distance from the drill body transition to the cutting insert pockets 34 to be kept short, to reduce any bending moments on the inserts.

The inboard cartridge 204 and the outboard cartridge 206 may have apertures 216 and 218 respectively, through the cartridges for affixing the cartridges to the drill body. As shown in FIGS. 10A and 10D, an aperture 216 through the inboard cartridge 204 provides for positioning thereof in a fixed position. The aperture 218 through the outboard cartridge 206 may be a movable cartridge adjacent the face surface and selectively slidable or movable relative to the tool axis. The aperture 218 may be a slot to allow translation of the outboard cartridge 206 as in prior examples, with varying amounts of translation contemplated. Other aspects of the cartridges 204 and 206, the inserts 220 and holder 202 may be similar to prior examples.

In this embodiment, there is also provided a centrally disposed drilling system 230. The system 230 may comprise a modular type of system 230 which is selectively positionable in a suitable positioning configuration formed in the holder 202 at a central location between the cartridges 204 and 206. In the embodiment shown, the positioning configuration may be a bore such as a cylindrical hole 236 formed in the holder 202, but other suitable configurations are contemplated, such as a slot, polygonal bore or other suitable configuration for accepting and retaining system 230 therewith. The system 230 may then be a modular system wherein different drilling systems may be usable to be accepted by the positioning configuration 236. In the example shown in FIG. 10, the system 230 includes a replaceable holder body 235 in which a replaceable cutting insert 231 may be selectively positioned, with the cutting insert type of a variety of types or configurations for example. The modular type of system provides a drill system which provides significant flexibility to reconfigure the system with different cutting inserts 231 for example, to optimize the system for use in different applications. The system 230 allows replacement of the drilling insert 231 and/or the replaceable holder body 235 to easily modify the drilling configuration or provide a new insert 231 upon wearing of an insert during a drilling operation. The central cutting insert 231 is positioned with first and second cutting edges disposed adjacent the rotational axis of the drill. As an example, the central cutting insert 231 may be a blade type of insert or other suitable insert configurations could be used. Alternatively, if desired, the central cutting edges could be integrally formed in the drill body. The central insert 231 may facilitate a drilling operation by enhancing stability of the drilling tool, particularly as a hole gets deeper. As the outer cutting surfaces of the tool 200 are provided by cutting inserts 220, which do not have a cutting margin, desired stability throughout a drilling operation may be enhanced by providing a central drilling system 230 and insert 231. For example, at increasing hole depth, the provision of a central insert 231 can provide additional stability to the tool during drilling. For example, at a hole depth of about one to four times depth to diameter or more, the stability provided by the central insert can be helpful. The centrally disposed cutting insert 231 can be of a variety of types, such as a spade type of insert. In the example of FIG. 10, the central insert 231 may be an insert referred to as the Gen3sys insert as sold by Allied Machine & Engineering Corp. Such an insert has a helical margin, curved cutting edges and a unique cutting geometry to provide high penetration rates, durability hole quality, surface finish, true position and stability, and other advantages. In such an example, the drilling tool provided with a centrally disposed cutting system 230 of this or similar type would provide a highly stable system, which includes indexability of cartridges according to examples as set forth herein. The central insert 231 may be positioned in a bore or hole formed in the holder body 235, wherein holder 235 may be secured in position by a set screw (not shown) positioned in aperture 232 formed in the side of drill body 202 adjacent the bore 236. The central insert body 235 may include a cut out portion 234 forming a seating surface for the set screw for example. Other arrangements to secure the central insert system 230 into the desired position are contemplated.

Figure 12:
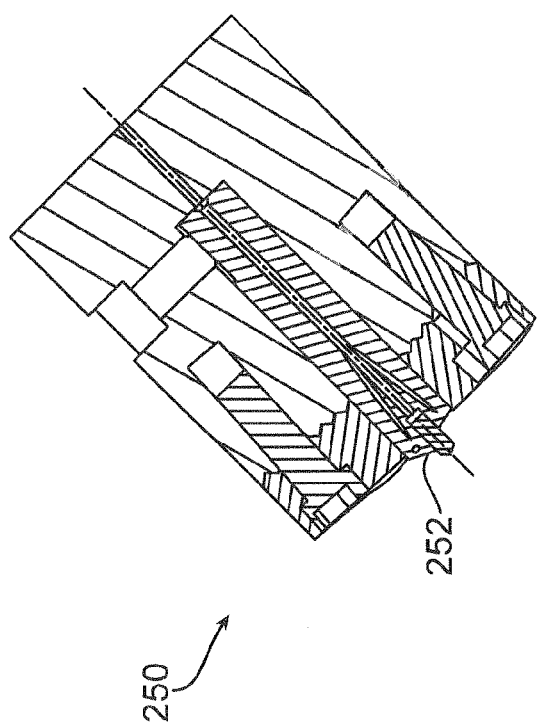
FIG. 12 shows a cross sectional view of an alternate embodiment similar to FIG. 10.
Figure 14:
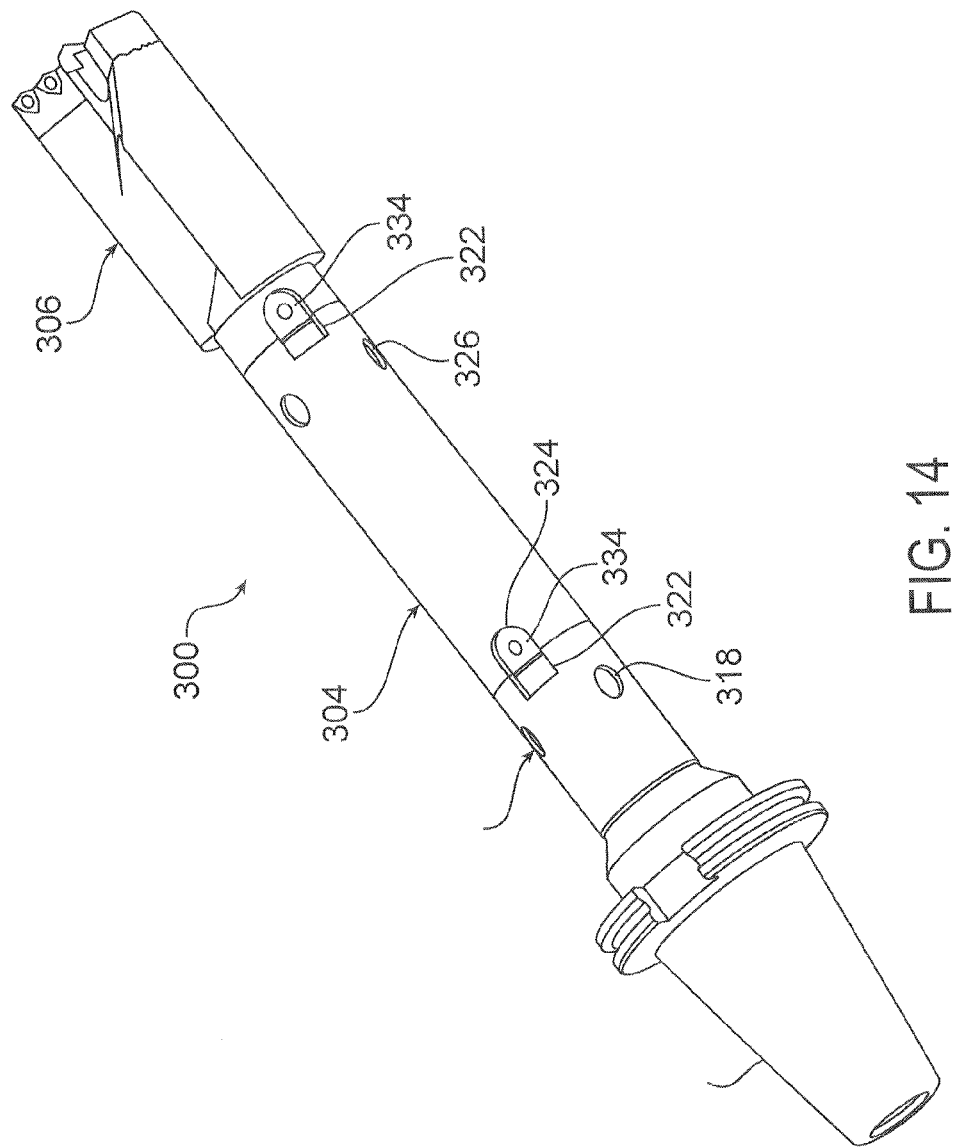
FIG. 14 shows an embodiment of a modular holder that may be used with the invention.
Figure 15:
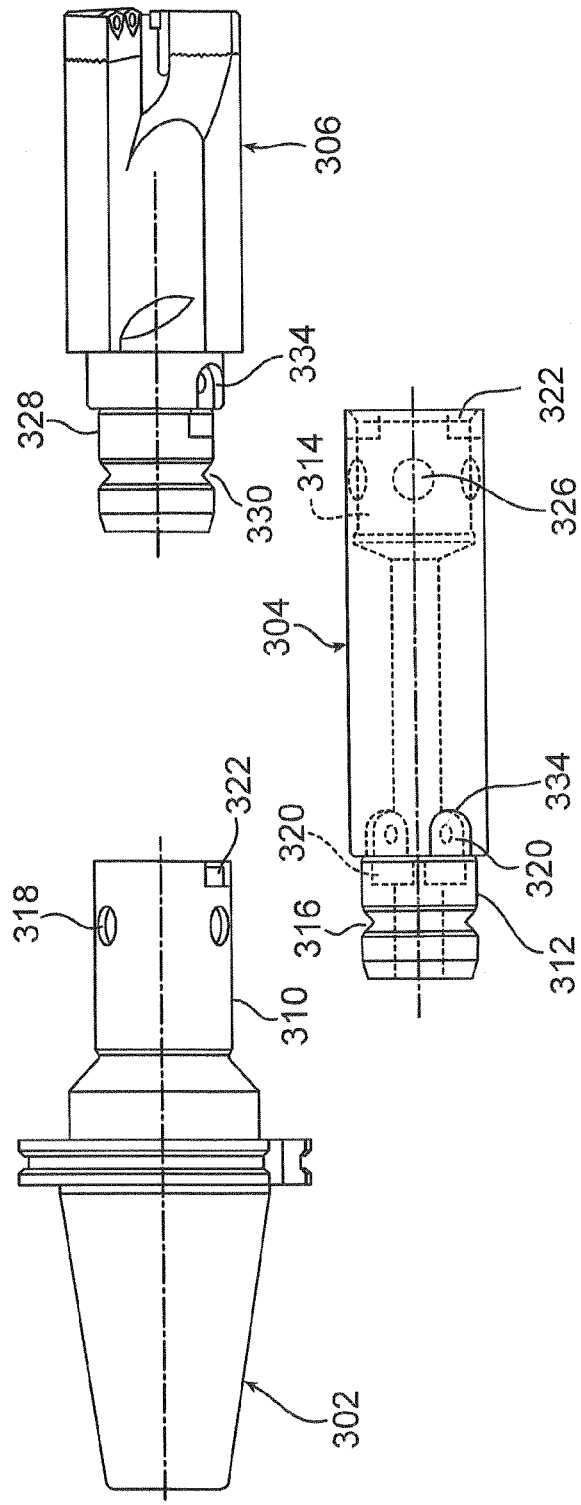
FIG. 15 shows an exploded view of an embodiment of the modular holder shown in FIG. 14.
Figure 16:
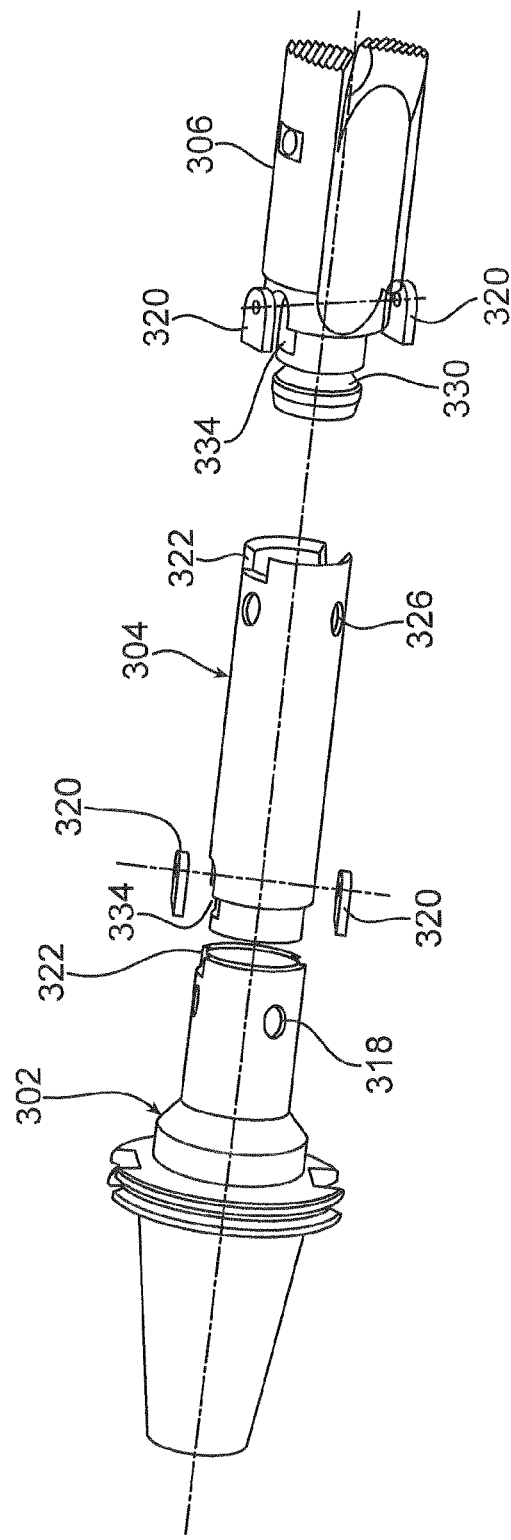
FIG. 16 shows an exploded view of the connections between components of a modular holder embodiment.

Turning to FIG. 11, an alternative tool 240 having similar characteristics to prior examples and having an alternative central cutting system 242 is shown. The central cutting system 242 in this example may be similar to an ASC solid carbide twist drill positioned in the center, such as sold by Allied Machine & Engineering Corp. In FIG. 12, an alternative tool 250 having similar characteristics to prior examples and having an alternative central cutting system 252 is shown. The central cutting system 252 in this example may have a replaceable cutting insert similar to the embodiment of FIG. 10, such as a T-A or GEN2 insert as sold by Allied Machine & Engineering Corp. Other insert type configurations, such as provided by Allied Machine & Engineering Corp. or other manufacturers may be used, or other centrally positioned cutting systems or configurations may be usable and are contemplated in the invention.

Turning to FIGS. 13A-13D, in association with the examples provided or others using a central cutting system 260, the tool still provides adjustability in association with the cutting operation in a manner similar to prior examples. As seen in these Figs., the outboard cartridge 206 may be made adjustable, with the smallest drill diameter shown in FIGS. 13A and 13B and the largest drill diameter shown in FIGS. 13C and 13D. The FIGS. 13B and 13D show the overlap of the various inserts 220 on one side of the central system 260 for clarity. The inserts 220 may also be indexable to provide new cutting surfaces as previously described. As seen in FIG. 13D, even at the largest diameter, where the outboard cartridge 206 is fully extended, there is overlap between the central insert 260 and the adjacent cutting insert 220 in the cartridge 206.

Figure 17:
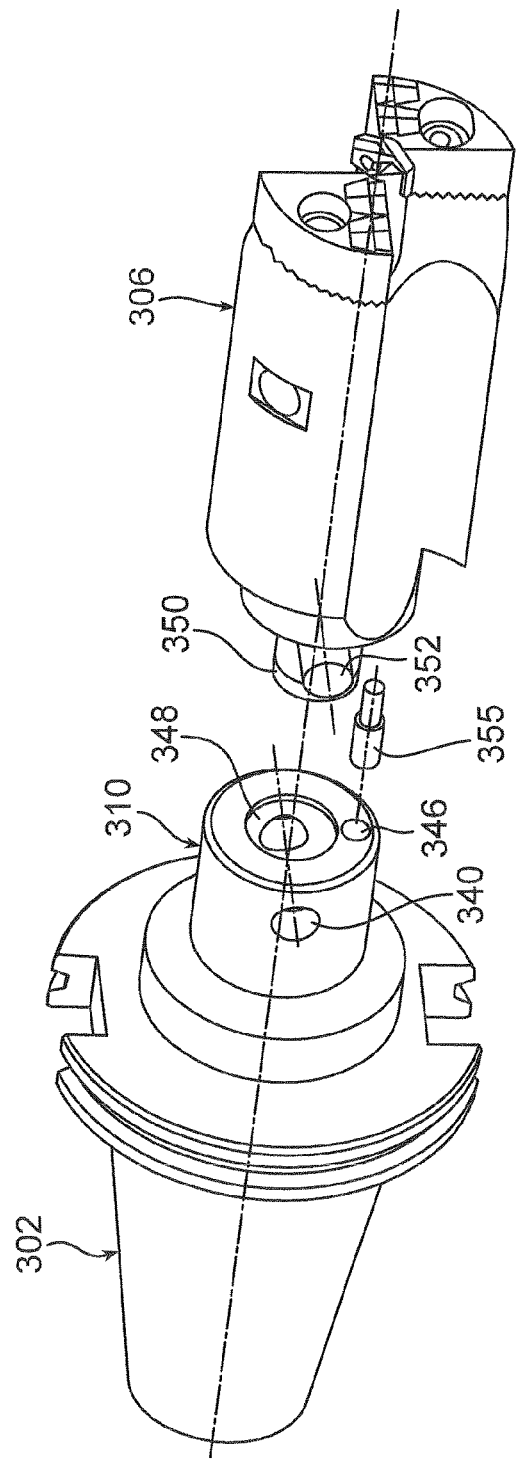
FIG. 17 shows an exploded view of the connections between components of a modular holder embodiment.
Figure 18:
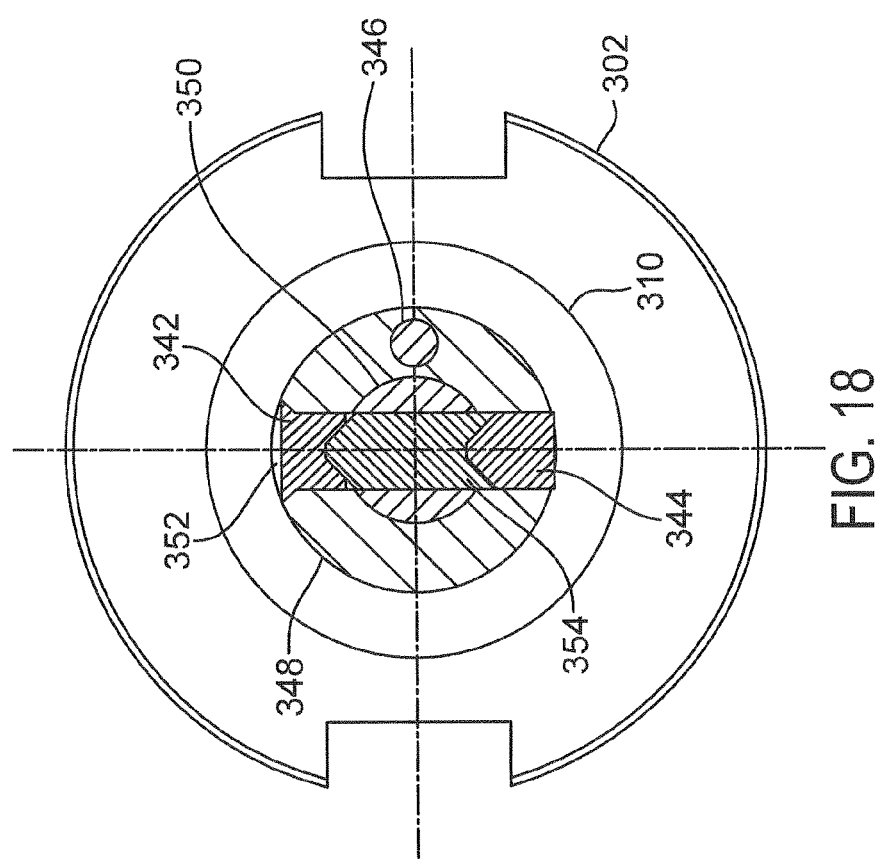
FIG. 18 shows a cross sectional view showing an embodiment of the connection between components of a modular holder arrangement.

In association with the examples of the invention, there may also be provided a modular drill body configuration as shown in FIGS. 14-18 for example. In this example, the drill body or holder is shown at 300, and may include a plurality of sections including a shank portion 302, at least one extension portion 304 and a head portion 306, to allow a desired drill body to be configured. The modular system allows different shank configurations 302 to be easily implemented, different lengths of drill body 300 to be easily implemented via the at least one extension portion 304, and alternative head configurations 306 to be interchanged. In this example, a Cat 50 shank is shown, being a standard type of tool holder shank configuration used in drilling tools in association with drill chucks. Other shank configurations can include, but are not limited to, Cat 40 tool holder shank configuration, BT tool holder configurations, floating tap tool holder configurations, straight shank tool holder configurations, R8 tool holder configurations, HSK tool holder configurations, Morse Taper tool holder configurations, Kaiser configurations, flanged straight configurations and others. In this example, the shank portion 302 is designed to mate with a particular drive system, and has a connecting portion 310 associated therewith. The connecting portion can then mate with and connect an extension portion 304 as shown, or be directly connected to a head portion 306 if desired. In this example, an extension portion 304 has a rearward mating portion 312 and a forward mating portion 314. The rearward mating portion 312 may have a reduced diameter which extends into the connecting portion 310 of shank portion 302 (or another extension portion for example), and is selectively securable therewith. In this example, the mating portion 312 may include a groove 316 positioned to correspond to apertures 318 on the mating portion 310 of shank portion 302. Thrust screws (not shown) may be used in association with the apertures 318 to engage the groove 316 and retain the extension portion 304 with shank portion 302, or other suitable arrangements may be used and are contemplated in the invention. Alignment of the extension portion 304 with the shank portion 302 may also be provided by drive or key members 320 provided in association with keyways 322 and 334 that provide orientation of the components and drive the modular connection between the components. The keyways 322 and 334 are provided in association with the shank portion 302 and extension portion 304 respectively, for example. Similarly, the forward mating portion 314 may be a recess to receive a connecting portion 328 of the head portion 306 in a similar manner, with apertures 326 corresponding to a groove 330 formed in connecting portion 328 to retain head portion 306 therewith via a system such as shown in FIGS. 17 and 18, or other suitable system. Drive members 320 in association with keyways 322 and 334 formed in the extension portion 304 and head portion respectively, to facilitate connecting the head portion 306 in a desired orientation. Other connection or alignment arrangements are usable and contemplated by the invention.

As should be recognized, the modular arrangement of the tool holder or drill body allows a great amount of flexibility in configuring the tool holder in various manners for various applications or environments.

In an embodiment, the connection between a head portion 306 and an extension portion 304 or shank portion 302 is shown in FIGS. 17 and 18. In this example, the connecting portion 310 of the shank portion (or extension portion) may include a recess 348 into which a post extension 350 of the head portion 306 (or extension portion) is positioned. A receiving aperture 352 may be provided in which offset cone members engage. For example, cone recesses may be provided in center stud 354 in drawing in a cone 344 on one end and inverted cone 342 on other end, which engage and lock into one another in the receiving aperture 352. Other suitable arrangements to couple the portions of the modular system together are contemplated and any suitable system may be used. The coupling system as shown in this example may be used to secure the post 350 in position within recess 348. An alignment or orientation pin 355 may cooperate with aperture 346 on the shank portion 302 and corresponding aperture (not shown) on the head portion 306 to align these members. Other connection or alignment arrangements are usable and contemplated by the invention.

Figure 19:
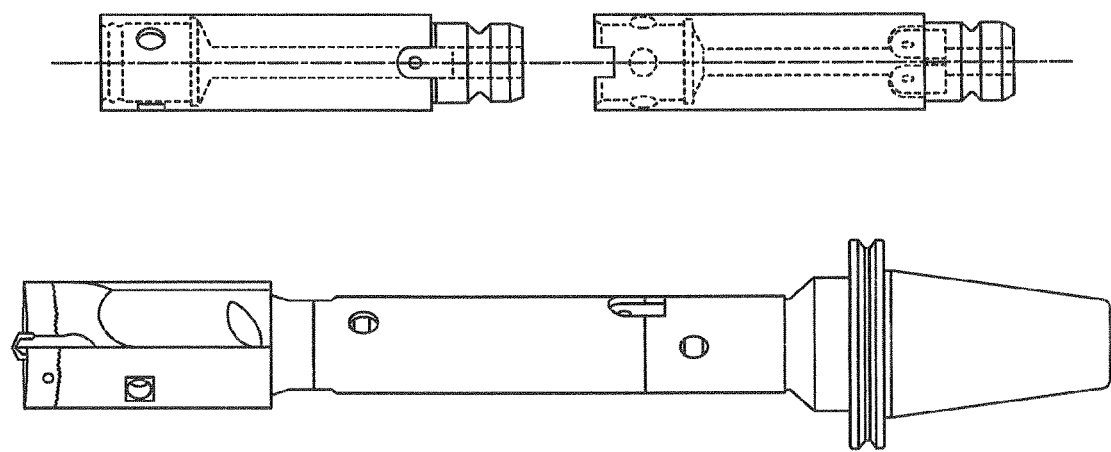
FIGS. 19-22 show alternative embodiments of holder arrangements that may be used in the invention.

It should be recognized that various modular configurations are easily achieved. As shown in FIG. 19, the number of extension portions 304 can be selected for a desired hole depth for example. Other variations, such as changing the shank portion 302 and/or changing head portion 306 if desired.

Figure 20:
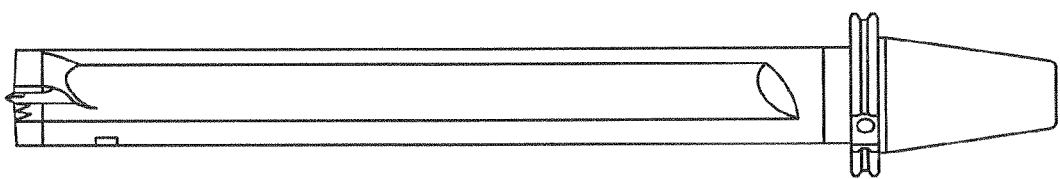
Figure 21:
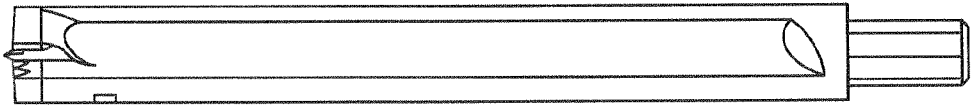
Figure 22:
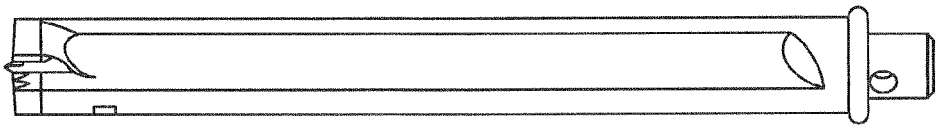

To provide an idea of different shank configurations usable with the holder or drill body in different examples of the invention, FIGS. 20-22 show various configurations that are usable. In FIG. 20, a Cat 50 configuration is shown in a one piece or non-modular configuration for example. In FIG. 21, a shank portion is shown, and in FIG. 22, a Kaiser shank is shown. These configurations and others as noted could be used in modular or non-modular configurations. The addition of the adjustable cutting head arrangement then provides significant advantages as set forth in the examples of the invention.

Figure 23:
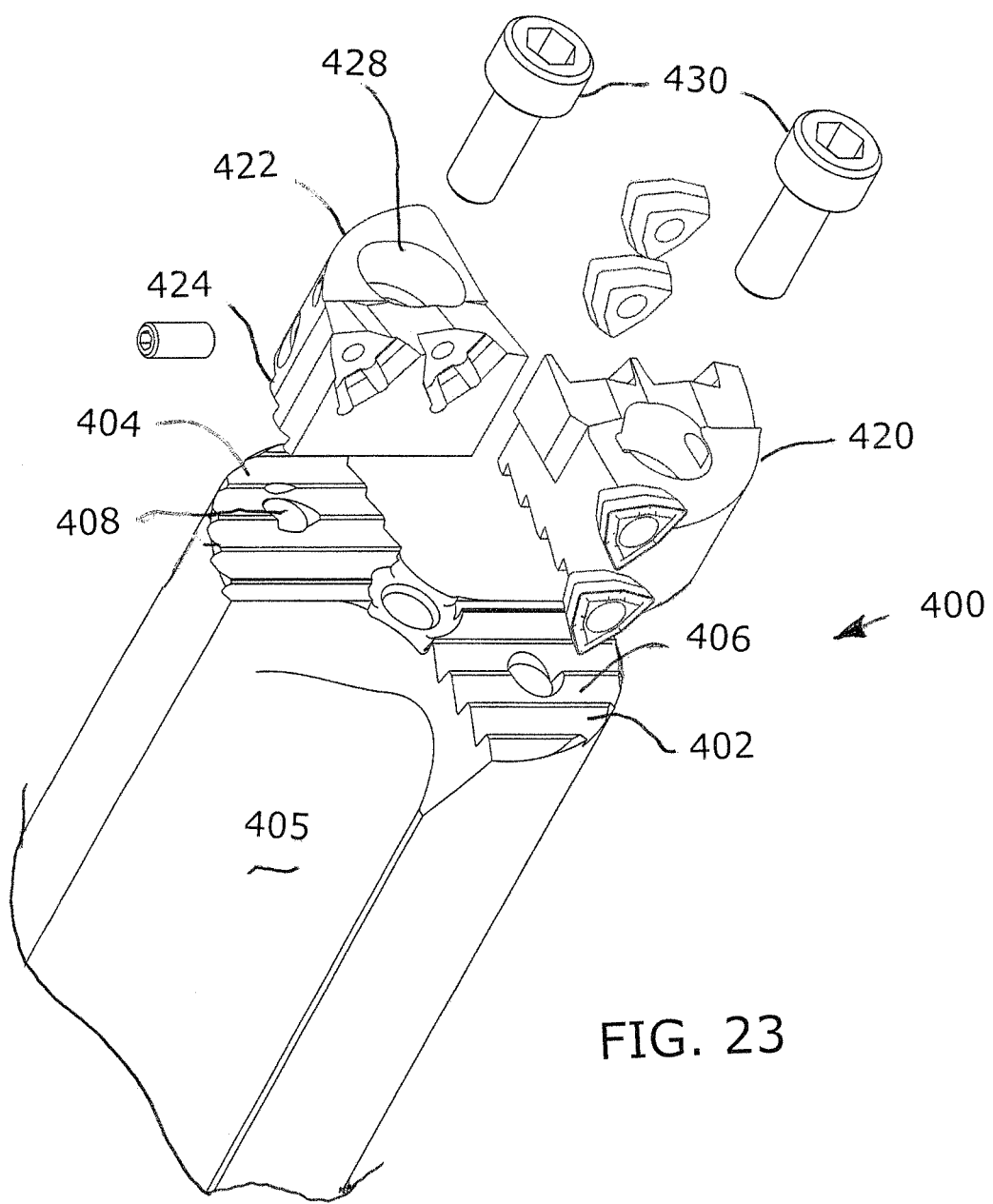
FIGS. 23-26 show an alternative example of the invention.
Figure 24:
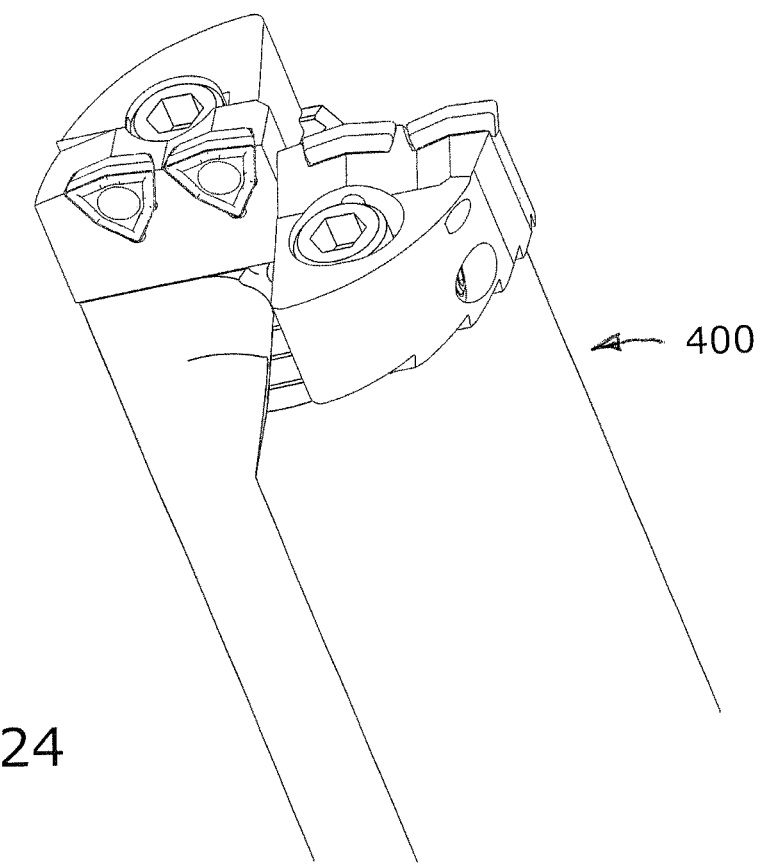

In another example of the invention, with reference to FIG. 23-, the drill 400 includes an alternate connection between the first and second face surfaces 402 and 404, and the insert cartridges 420 and 422. The connection again provides the adjustability by allowing at least the outboard cartridge 422 to be movable as seen in FIG. 24, and positioned opposite a fixed insert cartridge 420 at substantially 180°. Both cartridges could be made to be moveable. The adjustability of the movable cartridge 422 allows adjustment of the drilling size for accurate adjustment of the drill to a particular hole size requirement. As in prior examples, this example provides that the first and second face surfaces 402 and 404 may comprise a drive feature, such as serrations 406 over at least a portion of the face surfaces 402 and 404. As with prior examples, the serrations 406 may be 60 degree serrations, but other angle serrations may be suitable. The cartridges 420 and 422 may have corresponding geometry for engaging the restraining geometry on the face surfaces 402 and 404, such as corresponding serrations 424. As in prior examples, the drill body may have apertures 408 extending into the drill body, for receiving screws or fasteners, such as socket head cap head screws 430 for affixing the cartridges 420 and 422. The cartridges 420 and 422 have apertures 426 and 428, with the aperture 428 formed as a slot along the direction of serrations 424. The slot 428 may be sized to allow translation of the cartridge 422 to adjust the diameter of the formed hole. In operation, to adjust the cartridge 422, the fastener affixing the cartridge 422 to the drill body may be loosened, allowing the cartridge 422 to slide or translate the length of the slot 428. When the cartridge 422 is positioned as desired, the fastener may be re-tightened to affix the cartridge to the drill body. For example, smaller diameter tools may include 1½ inch, 1⅝ inch, and 1¾ inch. The 1½ inch example may be able to adjust out to 1⅝ inch, while the 1⅝ example may be able to adjust out to 1¾ inch, and the 1¾ example may be able to adjust out to 1⅞ inch. For smaller hole configurations, the adjustability provided by the tool according to the invention may be smaller, such as in the range of about 0.125 inches for example. In general, the degree of adjustability may be of alternative ranges as may be desired. The ability to provide adjustment according to the invention thereby allows desired finish hole sizes to be produced.

Figure 25:
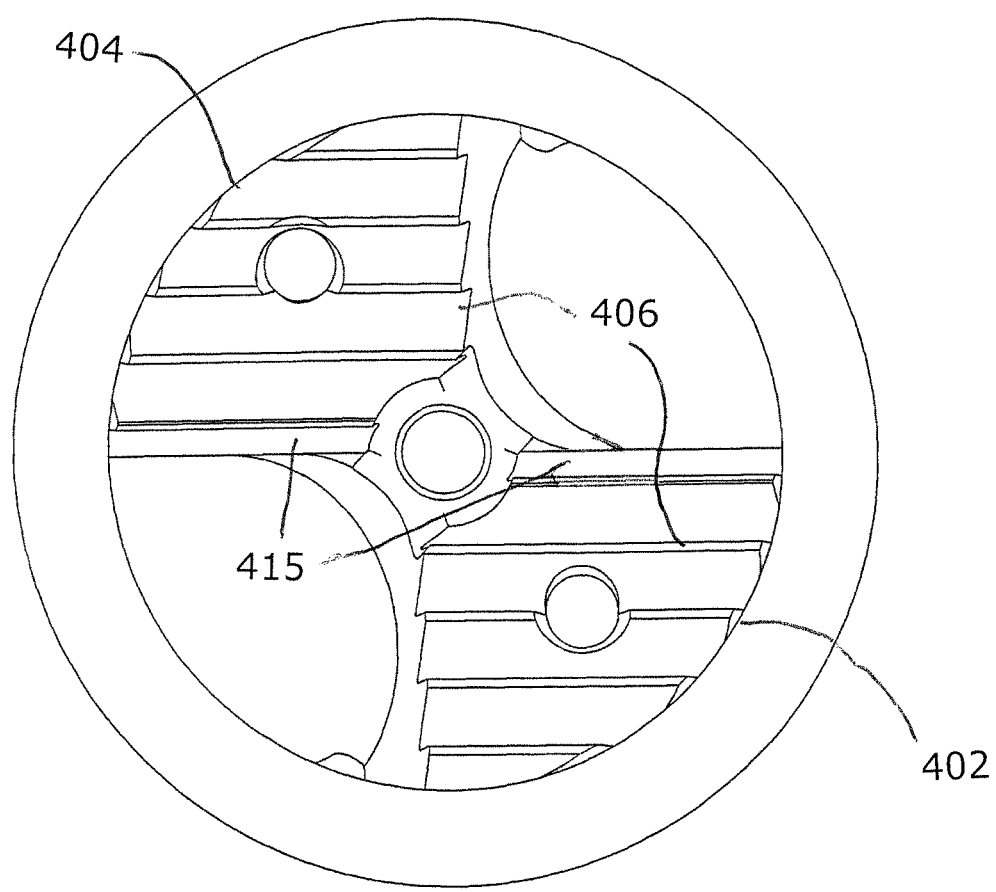
Figure 26:
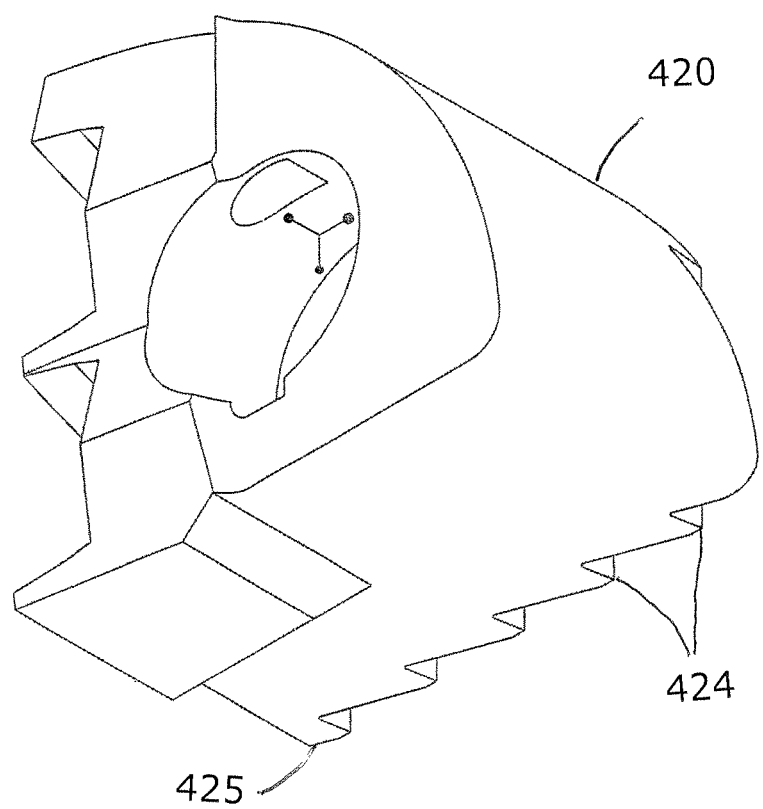
Figure 25:
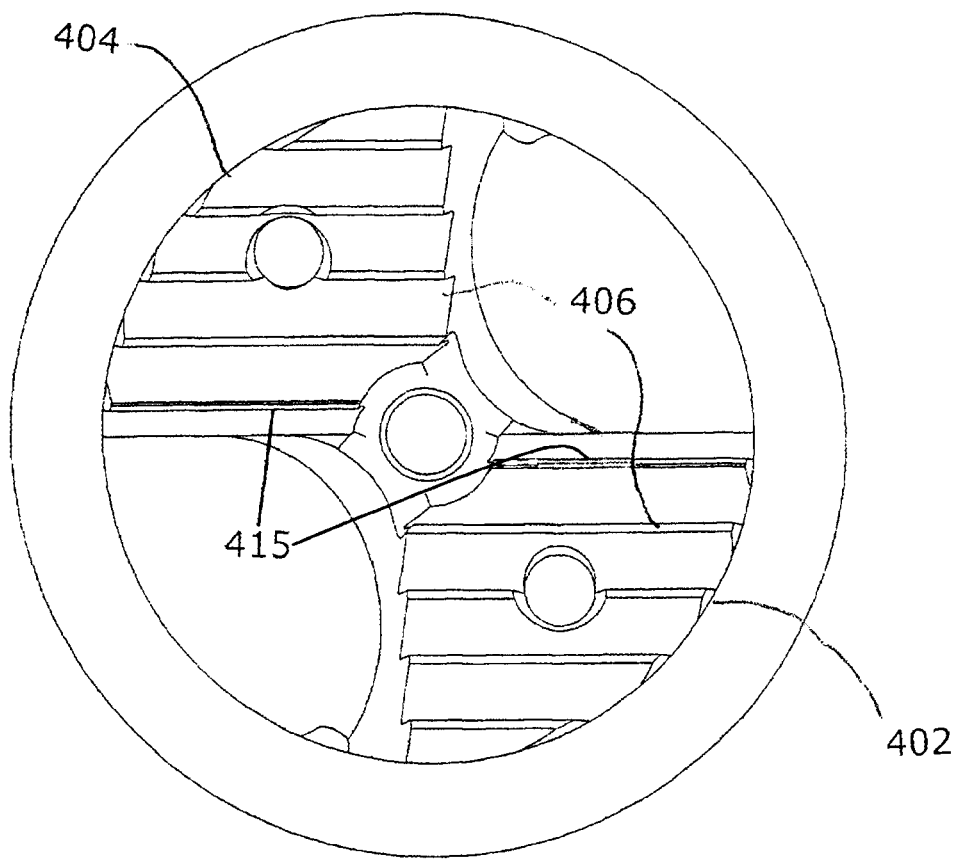

For smaller diameter holes, to ensure proper connection between the cartridges 420 and 422 and the face surfaces 402 and 404, a mechanism to prevent the cartridges 420 and 422 from lifting from the face surfaces is provided. In this example, the drilling tool may be useful for forming holes having diameters of 1⅞ inches or less. For such smaller diameter holes, the attachment of the cartridges 420 and 422 to the face surfaces 402 and 404 are again provided by screws 430, but at smaller diameters, the screws 430 may not be sufficient to prevent some lifting of the cartridges 420 and 422 from the face surfaces 402 and 404, which can cause chatter or vibration in the drilling operation. To substantially prevent lifting of the cartridges 420 and 422, the serrations 406 and 424 on the face surfaces 402 and 404 and cartridges 420 and 422, may include slight dovetail portions 415 and 425 respectively, as seen in FIGS. 25 and 26. The dovetail portions 425 and 425 lock the serrations 424 of the cartridges 420 and 422 with the serrations 406 of the face surfaces 402 and 404. The slight dovetail portions 415 and 425 are formed at an angle that resembles a joint with two interlocking pieces at right angles to each other. The angle of the dovetail portions may be between 5 and 15 degrees for example, with an angle of about 10 degrees shown in this example. Upon tightening down the screws 430, the cartridges are pulled in a direction into the positive dovetail to assist in securing the cartridges 420 and 422 to the face surface 402 and 404.

The configuration of this example may be used with other aspects of prior examples as may be desired for a particular application.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. An adjustable drill comprising:
    a drill body having a longitudinal axis, comprising:
        at least one face surface including a plurality of first serrations;
        at least one cartridge, having a cooperating plurality of second serrations, to be driven with the drill body when assembled therewith, the at least one cartridge including at least one insert pocket;
        the plurality of first and second serrations having dovetail portions;
        a fastening system for releasably affixing the at least one cartridge to the drill body, wherein the fastening system pulls the at least one cartridge in a direction into the positive dovetail formed between the first and second serrations; and
    at least one insert releasably affixed in the at least one insert pocket.

2. The adjustable drill according to claim 1, wherein the at least one face surface is angled from a plane perpendicular to the rotational axis of the drill.

3. The adjustable drill according to claim 1, wherein the dovetail portions are formed at an angle between five and twenty degrees.

4. The adjustable drill according to claim 1, wherein the dovetail portions are formed at an angle of about ten degrees.

5. The adjustable drill according to claim 1, wherein the plurality of serrations are formed at about sixty degrees.

6. The adjustable drill according to claim 1, wherein the diameter of a hole formed by the drill is one and ⅞ inches or less.

7. The adjustable drill according to claim 1, wherein the diameter of a hole formed by the drill is between 1½ inches and ⅝ inches.

8. The adjustable drill according to claim 1, wherein the diameter of a hole formed by the drill is between 1⅝ inches and 1¾ inches.

9. The adjustable drill according to claim 1, wherein the diameter of a hole formed by the drill is between 1¾ inches and 1⅞ inches.

10. The adjustable drill according to claim 1 further comprising:
    first and second face surfaces comprising a plurality of first serrations and at least first and second cartridges having a cooperating plurality of second serrations, to be driven with the drill body when assembled with the first and second face surfaces, the first and second cartridges including at least one insert pocket.

11. The adjustable drill according to claim 10, wherein the first and second face surfaces are angled from a plane perpendicular to the rotational axis of the drill.

12. The adjustable drill according to claim 10, wherein the first and second cartridges comprise at least two insert pockets.

13. The adjustable drill according to claim 10, wherein the plurality of first and second serrations each have a dovetail portion.

14. The adjustable drill according to claim 13, the plurality of portions including a shank portion, and a head portion.

15. The adjustable drill according to claim 10, wherein the fastening system is at least one screw for each of the at least first and second cartridges, and wherein upon tightening down the at least one screw, each of the first and second cartridges are pulled in a direction into the positive dovetail formed between the dovetail portions of the first and second serrations.

16. The adjustable drill according to claim 1, wherein the drill body is formed as a modular system comprising a plurality of portions.

17. The adjustable drill according to claim 16, the plurality of portions further comprising at least one extension portion between the shank portion and the head portion.

18. The adjustable drill according to claim 1, wherein the at least one insert is selected from the group consisting of a trigon insert, a diamond insert, a quadron insert and a square insert.

19. The adjustable drill according to claim 1, wherein the at least one insert is a trigon insert having three sides with cutting edges, and first and second clearance surfaces adjacent the cutting edges of the insert.

20. The adjustable drill according to claim 1, wherein the fastening system is at least one screw, wherein upon tightening down the at least one screw, the at least one cartridge is pulled in a direction into the positive dovetail formed between the dovetail portions of the first and second serrations.

* * * * *

UNITED STATES PATENT AND TRADEMARK OFFICE
CERTIFICATE OF CORRECTION

| | | |
|---|---|---|
| PATENT NO. | : 9,004,827 B2 | Page 1 of 2 |
| APPLICATION NO. | : 13/832105 | |
| DATED | : April 14, 2015 | |
| INVENTOR(S) | : Mark D. Meyer et al. | |

It is certified that error appears in the above-identified patent and that said Letters Patent is hereby corrected as shown below:

In the Drawings

In Fig. 25:

The labels for reference numbers "406" and "415" in Figure 25 have been relocated to appropriately point to the serrations and dovetail portions. (See Attached Sheet)

Signed and Sealed this
Twenty-ninth Day of September, 2015

Michelle K. Lee
*Director of the United States Patent and Trademark Office*